US012589896B2

(12) United States Patent
Melcher

(10) Patent No.: US 12,589,896 B2
(45) Date of Patent: Mar. 31, 2026

(54) INDUSTRIAL AERIAL ROBOT SYSTEMS AND METHODS

(71) Applicant: Thomas W. Melcher, Mesa, AZ (US)

(72) Inventor: Thomas W. Melcher, Mesa, AZ (US)

( * ) Notice: Subject to any disclaimer, the term of this patent is extended or adjusted under 35 U.S.C. 154(b) by 0 days.

(21) Appl. No.: 18/999,742

(22) Filed: Dec. 23, 2024

(65) Prior Publication Data

US 2025/0121963 A1     Apr. 17, 2025

Related U.S. Application Data

(63) Continuation of application No. PCT/US2023/026157, filed on Jun. 23, 2023, and a
(Continued)

(51) Int. Cl.
| | |
|---|---|
| *B64U 10/20* | (2023.01) |
| *B64U 30/12* | (2023.01) |
| *B64U 30/24* | (2023.01) |
| *B64U 30/26* | (2023.01) |
| *B64U 30/297* | (2023.01) |
| *B64U 50/19* | (2023.01) |
(Continued)

(52) U.S. Cl.
CPC ............. *B64U 10/20* (2023.01); *B64U 30/12* (2023.01); *B64U 30/24* (2023.01); *B64U 30/26* (2023.01); *B64U 30/297* (2023.01); *B64U 50/19* (2023.01); *B64U 70/50* (2023.01); *B64U 2101/60* (2023.01)

(58) Field of Classification Search
CPC ......... B64U 10/20; B64U 40/20; B64U 50/27
See application file for complete search history.

(56) References Cited

U.S. PATENT DOCUMENTS

| | | |
|---|---|---|
| 3,589,646 A | 6/1971 | Mori |
| 3,868,073 A | 2/1975 | King |
(Continued)

FOREIGN PATENT DOCUMENTS

| | | |
|---|---|---|
| DE | 102008004054 | 12/2010 |
| WO | 1998002350 | 1/1998 |

OTHER PUBLICATIONS

International Search Report & Written Opinion for Application No. PCT/US2023/0026101, mailed Nov. 9, 2023.
(Continued)

*Primary Examiner* — Justin M Benedik
(74) *Attorney, Agent, or Firm* — SNELL & WILMER L.L.P.

(57) ABSTRACT

An aircraft has a boom, a propulsion assembly coupled to a first end of the boom, and a first wing coupled to a second end of the boom. The first wing can be coupled to the boom by a (first) articulated joint. The propulsion assembly can be coupled to the boom by a (second) articulated joint. The articulated joints can provide various adjustments between the wing(s) and the boom (e.g., stowed, deployed, anhedral, dihedral, sweep, angle of attack, collective pitch control, the cyclic pitch control, etc.) and between the propulsion system and the boom (e.g., to move between vertical flight and horizontal flight). A payload can be connected to the boom with one of the articulated joints whereby the articulated joint adjusts a position of the payload during flight to maintain desired flight characteristics and stabilize the payload.

20 Claims, 17 Drawing Sheets

Related U.S. Application Data continuation of application No. PCT/US2023/026161, filed on Jun. 23, 2023, and a continuation of application No. PCT/US2023/026101, filed on Jun. 23, 2023.

(60) Provisional application No. 63/481,105, filed on Jan. 23, 2023, provisional application No. 63/355,972, filed on Jun. 27, 2022.

(51) Int. Cl.
     *B64U 70/50*     (2023.01)
     *B64U 101/60*    (2023.01)

(56) References Cited

U.S. PATENT DOCUMENTS

| | | | | |
|---|---|---|---|---|
| 4,452,410 | A | 6/1984 | Everett | |
| 4,598,887 | A | 7/1986 | Jordan | |
| 5,707,027 | A | 1/1998 | Hiesener | |
| 5,799,900 | A | 9/1998 | McDonnell | |
| 5,806,793 | A | 9/1998 | Brossier | |
| 5,884,873 | A | 3/1999 | Breit | |
| 5,996,933 | A * | 12/1999 | Schier | B64C 39/06 |
| | | | | 244/17.11 |
| 6,138,943 | A | 10/2000 | Huang | |
| 6,845,939 | B1 | 1/2005 | Baldwin | |
| 7,070,145 | B2 | 7/2006 | Baldwin | |
| 7,988,102 | B2 | 8/2011 | Juergen | |
| 8,172,173 | B2 | 5/2012 | Carlson | |
| 8,191,834 | B2 | 6/2012 | Westenberger | |
| 8,276,392 | B2 | 10/2012 | Van Der Woude | |
| 9,302,788 | B2 | 4/2016 | Wan | |
| 10,059,442 | B2 | 8/2018 | Olm | |
| 11,548,637 | B2 * | 1/2023 | Melcher | B64C 9/02 |
| 12,037,118 | B2 | 7/2024 | Melcher | |
| 2005/0051667 | A1 | 3/2005 | Arlton | |
| 2006/0011777 | A1 | 1/2006 | Arlton | |
| 2006/0032971 | A1 | 2/2006 | Baldwin | |
| 2007/0114325 | A1 | 5/2007 | Baldwin | |
| 2012/0025012 | A1 | 2/2012 | Arlton | |
| 2012/0223191 | A1 | 9/2012 | Roberts | |
| 2013/0099048 | A1 | 4/2013 | Fisher | |
| 2013/0247584 | A1 | 9/2013 | Kasibhotla | |
| 2017/0008625 | A1 | 1/2017 | Olm | |
| 2018/0101169 | A1 | 4/2018 | Applewhite | |
| 2019/0322368 | A1 * | 10/2019 | Melcher | B64G 1/401 |
| 2025/0002148 | A1 | 1/2025 | Melcher | |

OTHER PUBLICATIONS

Restriction Requirement dated May 10, 2021 in U.S. Appl. No. 16/393,736.

Non-Final Office Action dated Jan. 13, 2022 in U.S. Appl. No. 16/393,736.

Notice of Allowance dated Sep. 12, 2022 in U.S. Appl. No. 16/393,736.

Non-Final Office Action dated Aug. 17, 2023 in U.S. Appl. No. 18/093,796.

Notice of Allowance dated Mar. 5, 2024 in U.S. Appl. No. 18/093,796.

International Search Report and Written Opinion dated Aug. 12, 2019 in PCT International Patent Application No. PCT/US2019/028996.

International Preliminary Report on Patentability dated Oct. 27, 2020 in PCT International Patent Application No. PCT/US2019/028996.

International Search Report and Written Opinion dated Nov. 9, 2023 in PCT International Patent Application No. PCT/US2023/26101.

International Search Report and Written Opinion dated Nov. 9, 2023 in PCT International Patent Application No. PCT/US2023/26161.

Non-Final Office Action dated Jan. 15, 2025 in U.S. Appl. No. 18/731,094.

Notice of Allowance dated Sep. 3, 2025 in U.S. Appl. No. 18/731,094.

Office Action dated May 27, 2022 in India Patent Application No. 202027043647.

European Search Report dated Dec. 14, 2021 in Application No. 19792117.4.

European Search Report dated May 15, 2023 in Application No. 19792117.4.

Office Action dated Aug. 5, 2022 in Philippines Patent Application No. 1/2020/551665.

Office Action dated Dec. 23, 2022 in Philippines Patent Application No. 1/2020/551665.

Office Action dated Jun. 20, 2023 in Chinese Patent Application No. 201980042925.3.

Office Action dated Aug. 16, 2024 in Chinese Patent Application No. 201980042925.3.

Office Action dated Jun. 8, 2023 in Brazil Patent Application No. BR112020021771-9.

Office Action dated Jul. 2, 2024 in Canadian Patent Application No. 3095805.

Office Action dated Jul. 5, 2024 in Indonesia Patent Application No. P00202008023.

Taldesign Official: "PopUp", XP055868399, Retrieved from the Internet: URL:https://www.youtube.com/watch?v=LOhXslrvdmw &1c=Ugg~1rCQmg4JlngCoAEC (2017).

* cited by examiner

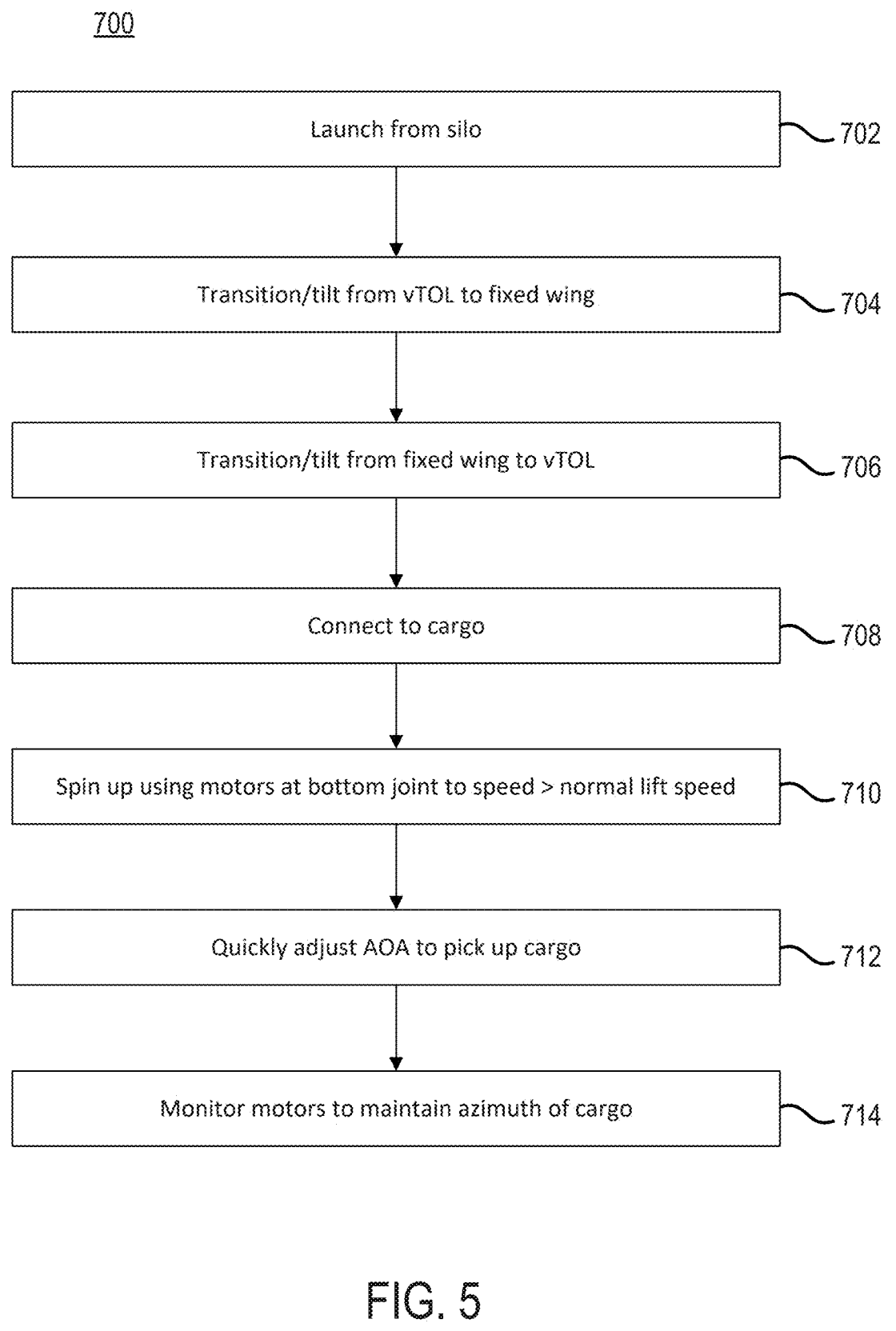

700

```
┌─────────────────────────────────────────────────────┐
│                  Launch from silo                     │──── 702
└─────────────────────────────────────────────────────┘
                          │
                          ▼
┌─────────────────────────────────────────────────────┐
│          Transition/tilt from vTOL to fixed wing      │──── 704
└─────────────────────────────────────────────────────┘
                          │
                          ▼
┌─────────────────────────────────────────────────────┐
│          Transition/tilt from fixed wing to vTOL      │──── 706
└─────────────────────────────────────────────────────┘
                          │
                          ▼
┌─────────────────────────────────────────────────────┐
│                  Connect to cargo                     │──── 708
└─────────────────────────────────────────────────────┘
                          │
                          ▼
┌─────────────────────────────────────────────────────┐
│  Spin up using motors at bottom joint to speed > normal lift speed │──── 710
└─────────────────────────────────────────────────────┘
                          │
                          ▼
┌─────────────────────────────────────────────────────┐
│             Quickly adjust AOA to pick up cargo       │──── 712
└─────────────────────────────────────────────────────┘
                          │
                          ▼
┌─────────────────────────────────────────────────────┐
│          Monitor motors to maintain azimuth of cargo  │──── 714
└─────────────────────────────────────────────────────┘
```

FIG. 5

INDUSTRIAL AERIAL ROBOT SYSTEMS AND METHODS

CROSS REFERENCE TO RELATED APPLICATIONS

This application is a Continuation of International Application No. PCT/US2023/026101, entitled "INDUSTRIAL AERIAL ROBOT SYSTEMS AND METHODS," filed on Jun. 23, 2023, which claims priority to, and the benefit of, U.S. Provisional Patent Application Ser. No. 63/355,972, entitled "INDUSTRIAL AERIAL ROBOT," filed on Jun. 27, 2022, and further claims priority to, and the benefit of, U.S. Provisional Patent Application Ser. No. 63/481,105, entitled "INDUSTRIAL AERIAL ROBOT SYSTEMS AND METHODS," filed on Jan. 23, 2023. This application is a Continuation of International Application No. PCT/US2023/026157, entitled "INDUSTRIAL AERIAL ROBOT SYSTEMS AND METHODS," filed on Jun. 23, 2023, which claims priority to, and the benefit of, U.S. Provisional Patent Application Ser. No. 63/355,972, entitled "INDUSTRIAL AERIAL ROBOT," filed on Jun. 27, 2022, and further claims priority to, and the benefit of, U.S. Provisional Patent Application Ser. No. 63/481,105, entitled "INDUSTRIAL AERIAL ROBOT SYSTEMS AND METHODS," filed on Jan. 23, 2023. This application is a Continuation of International Application No. PCT/US2023/026161, entitled "INDUSTRIAL AERIAL ROBOT SYSTEMS AND METHODS," filed on Jun. 23, 2023, which claims priority to, and the benefit of, U.S. Provisional Patent Application Ser. No. 63/355,972, entitled "INDUSTRIAL AERIAL ROBOT," filed on Jun. 27, 2022, and further claims priority to, and the benefit of, U.S. Provisional Patent Application Ser. No. 63/481,105, entitled "INDUSTRIAL AERIAL ROBOT SYSTEMS AND METHODS," filed on Jan. 23, 2023. The '101, '157, '161, '972, and '105 Applications are hereby incorporated by reference in their entirety for all purposes, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates in general to transportation systems, and, more particularly, to a transportation system using an electric vertical takeoff and landing (eVTOL) and short takeoff and landing (STOL) aircraft to transport heavy payloads.

BACKGROUND

Aircraft carry different payloads, including for example, passengers, cargo, sensors, and munitions. Various requirements can shape an aircraft design; for example, some missions require flight in a certain speed regime, some missions require heavy payload-carrying capacity, while other missions require high fuel efficiency.

One type of popular conventional aircraft is a helicopter which employs a single main rotor to provide both lift and thrust and an anti-torque tail rotor to prevent the body of the aircraft rotating in a contrary sense to the main rotor to provide directional control. Moreover, numerous multi-rotor systems have also been proposed over the years where different rotors can rotate in opposite senses to cancel out induced torque values. Multi-rotor aircraft are used and/or proposed for use in a range of applications including cargo and/or passenger transport. Multi-rotor aircraft benefit in particular from a reduced or eliminated need to generate horizontal velocity before takeoff. Some multi-rotor aircraft utilize one thrust generating system for vertical takeoff and/or landing capability, while using a separate thrust generating system in forward flight. Utilizing separate systems for vertical takeoff and landing and forward flight tends to result in reduced efficiency—e.g., reduced power-to-mass ratio, and increased disc loading—of the aircraft, thereby also reducing the overall payload capacity.

Therefore, a need exists for a transportation system with increased efficiency—i.e., power-to-mass ratio and reduced disc loading—capable of handling heavy cargo payload requirements while also being economically feasible.

In addition to the aircraft efficiency issues discussed above, traffic congestion is a major problem across the developed world and getting worse by the day. In all corners of the globe, people drive daily to commute to work, to shop, to travel cross-country for work or vacation, and for any number of other purposes. As populations grow in number and advance economically, more and more cars are added to the roadways. Two million passenger vehicles are added to the world's roadways every year. For 2018, an estimated 81.50 million vehicles were produced globally, up from 79.02 million in 2017. The world's infrastructure has so far not expanded or adapted to meet the growing demands.

One concept for reducing congestion is the introduction of self-driving vehicles. Self-driving vehicles can potentially communicate directly with each other and with local infrastructure systems to coordinate the speeds and locations of every vehicle on the road. Such coordination would allow for the removal and traffic lights and optimization of traffic fluidity. The introduction of self-driving vehicles en masse will allow drivers to reach their destinations quicker. However, an autonomous transportation future will not itself solve the congestion problem. Moving to autonomous vehicles does not reduce the number of vehicles on the road or increase the amount of space on existing highways.

Another proposed solution is to take commuting to the skies. In a concept similar to ridesharing, sky taxis in development will allow commuters to share a ride on aircraft between skyports spread throughout a metropolitan area. However, construction of hundreds of skyports in the hearts of cities around the world will cost billions and take decades. Once built, passengers will have to arrange transportation to and from skyports and process through security screenings. Moreover, due to their inefficient design, sky taxi aircraft will require full occupancy of multiple—e.g., between four and six-passengers to remain profitable. Unless a commuter is flying between hot-zones at peak times, there will more than likely be a wait before boarding. Even worse, remote destinations with few potential riders may not be able to support a proper skyport. Furthermore, efforts to reduce air taxi noise levels are ongoing but they are still quite loud. Hundreds of skyports in dense metropolitan centers may not be acceptable. The sky taxi concept requiring skyports limits the destinations to only large metropolitan centers.

Therefore, a need exists for a transportation system that can truly reduce congestion on the roads while also expanding travel into the air without requiring a large skyport infrastructure.

SUMMARY

In an exemplary embodiment, an aircraft comprises a boom, a propulsion system coupled to a first end of the boom via a stanchion, and a first wing coupled to a second end of the boom. The propulsion system comprises a first plurality of rotor blades configured to rotate about a propulsion system longitudinal axis, a first plurality of stator vanes, and a plurality of turbine blades disposed at an exit of the propulsion system. The plurality of turbine blades are coupled to, and configured to rotate with, the stanchion. The turbine blades are configured to rotate about an axis through a length thereof for diverting a core air flow through the propulsion system to thereby impart a torque onto the stanchion to rotate the boom with respect to the first plurality of stator vanes.

In various embodiments, the propulsion system further comprises a second plurality of rotor blades and a second plurality of stator vanes, wherein the first plurality of stator vanes is located axially between the first plurality of rotor blades and the second plurality of rotor blades, and the second plurality of stator vanes is located axially between the second plurality of rotor blades and the plurality of turbine blades. In various embodiments, the plurality of turbine blades is configured to rotate about the propulsion system longitudinal axis. In various embodiments, the propulsion system further comprises a duct coupled to the first plurality of stator vanes and defining a core flow path. In various embodiments, the aircraft further comprises a first articulated joint including a first electric motor configured to rotate the first wing about a longitudinal axis thereof with respect to the boom and a second electric motor configured to rotate the first wing about a lateral axis thereof with respect to the boom. In various embodiments, the first articulated joint further comprises a first driven gear meshingly engaged with the first electric motor, opposing flanges extending from the first driven gear, and a shaft pivotally coupled to the opposing flanges, whereby the first wing is pivotally mounted to the first articulated joint. In various embodiments, the aircraft further comprises a payload connector rotatably coupled to the first articulated joint, the first articulated joint further comprises a frame and a third electric motor mounted to the frame, and the third electric motor is configured to rotate the boom with respect to the payload connector.

In another example embodiment, an aircraft comprises a boom, a propulsion system coupled to a first end of the boom via a stanchion, and a first wing coupled to a second end of the boom via a first articulated joint. The first articulated joint can comprise a first electric motor configured to rotate the first wing about a longitudinal axis thereof with respect to the boom and a second electric motor configured to rotate the first wing about a lateral axis thereof with respect to the boom.

In various embodiments, the first articulated joint further comprises a driven gear meshingly engaged with the first electric motor, opposing flanges extending from the driven gear, and a shaft pivotally coupled to the opposing flanges, whereby the first wing is pivotally mounted to the first articulated joint. In various embodiments, the first articulated joint further comprises a drive lobe (a sectioned half diameter gear) extending from the shaft, wherein the drive lobe meshingly engages the second electric motor. In various embodiments, the first articulated joint further comprises a frame, a shell surrounding the frame whereby the boom is connected to the first articulated joint, and a third electric motor configured to rotate the shell with respect to the frame. In various embodiments, the first articulated joint further comprises a cog drive disc coupled at an inner diameter surface of the shell, wherein the third electric motor meshingly engages the cog drive disc. In various embodiments, the first articulated joint further comprise a brake rotor extending from the cog drive disc and a disc brake mounted to the frame, the disc brake configured to clamp to the brake rotor to prevent rotation of the shell with respect to the frame. In various embodiments, the aircraft further comprises a payload connector rotatably coupled to the first articulated joint, wherein the third electric motor is configured to rotate the payload connector with respect to the boom. In various embodiments, the boom is configured to rotate together with the first wing in a rotorcraft mode to generate thrust for the aircraft. In various embodiments, the aircraft further comprises a second wing coupled to the first end of the boom via a second articulated joint. In various embodiments, the second articulated joint comprises an inner sleeve mounted to the stanchion, an outer sleeve, and a bearing disposed between the inner sleeve and the outer sleeve whereby the outer sleeve is rotatable with respect to the inner sleeve.

In an exemplary embodiment, a method of the present disclosure includes generating a thrust with an electric propulsion system for an eVTOL aircraft, the thrust oriented in a vertical direction, launching the eVTOL aircraft from an aircraft container, hovering the eVTOL aircraft in vertical flight with a fuselage of the eVTOL aircraft vertically oriented, rotating a first wing of the eVTOL aircraft from a first folded position to a first unfolded position, rotating a second wing of the e VTOL aircraft from a second folded position to a second unfolded position, rotating the electric propulsion system with respect to the fuselage to orient the thrust to have a component in a horizontal direction, generating lift with at least one of the first wing and the second wing, and rotating the fuselage to a horizontally oriented position in response to generating the lift.

In various embodiments, the method further comprises connecting the eVTOL aircraft to a cargo, operating an electric motor in an articulated joint of the eVTOL aircraft to spin up the fuselage, and generating vertical lift with the first wing and the second wing in response to the fuselage spinning.

In various embodiments, the method further comprises operating a payload connector motor to adjust an azimuth angle of the cargo.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 5 is a flow chart for a method for picking up cargo with an eVTOL aircraft of the present disclosure, in accordance with various embodiments.

DETAILED DESCRIPTION

Figure 1A:
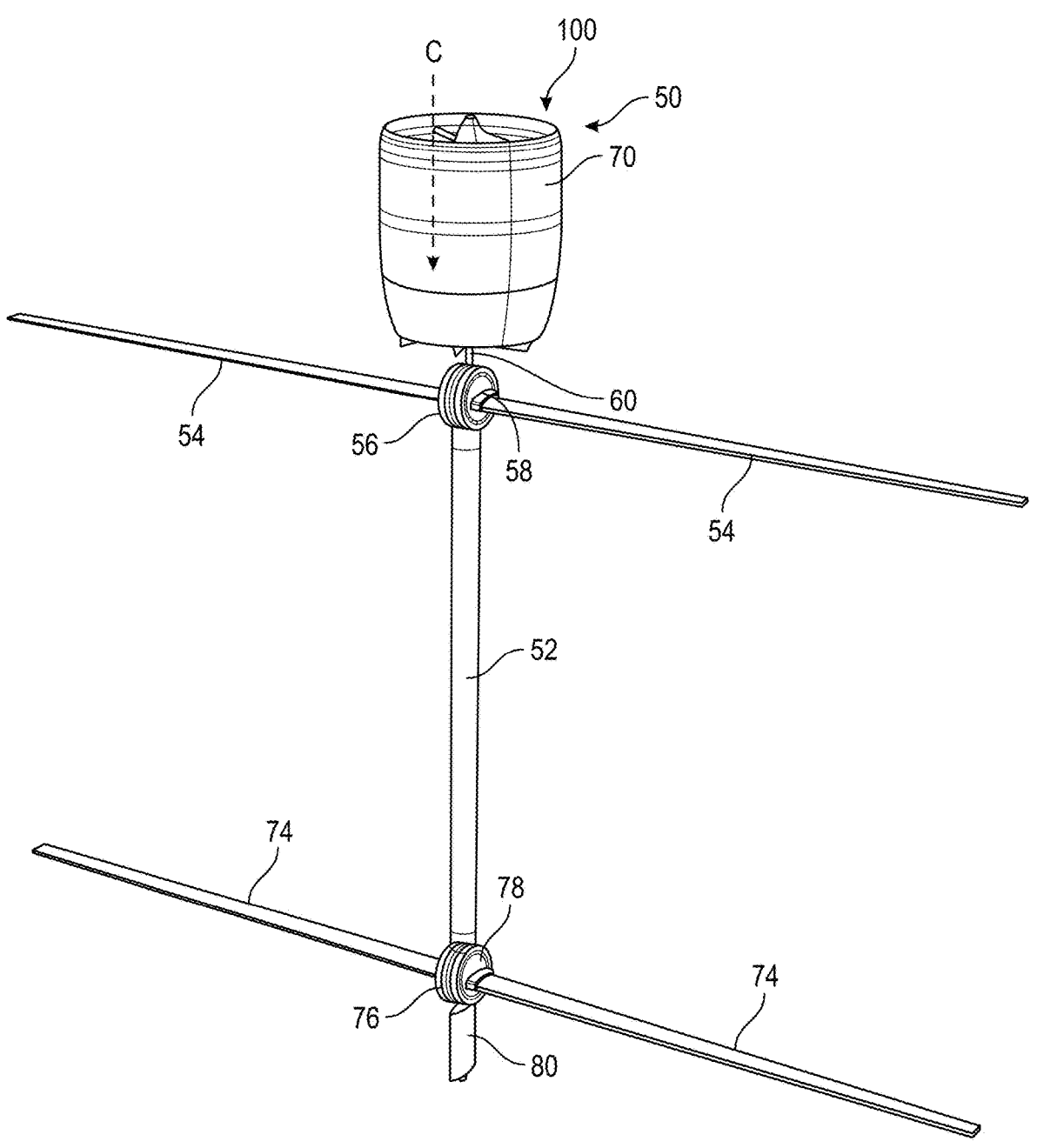
FIG. 1A through FIG. 1G are perspective views of a skyboom electric vertical takeoff and landing (eVTOL) aircraft during various phases of flight, in accordance with various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended statements.

For the sake of brevity, conventional techniques for electric motor construction, configuration, and use, as well as conventional techniques for rotor blade, stator blade, and nacelle management, operation, optimization, and/or control, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system or related methods of use.

Various shortcomings of prior rotary wing aircraft, fixed wing aircraft, and/or the like can be addressed by utilizing industrial aerial robots and related components configured in accordance with principles of the present disclosure. For example, prior propulsion approaches may typically utilize an engine coupled to rotor blades via a drivetrain for maintaining flight of the aircraft. The drivetrain may typically expose single points of failure for the aircraft. Moreover, the remainder of the aircraft (e.g., the fuselage, the cockpit, the tail boom, etc.) typically may comprise additional mass which does not directly contribute to powering, or generating thrust and/or lift to, the aircraft.

In contrast, exemplary systems and methods disclosed herein utilize the entire, or nearly the entire, mass of the aircraft to maintain angular spin momentum, resulting in increased power/mass ratio.

An eVTOL aircraft of the present disclosure can include power turbine modules located in a lower half of a shroud to convert propulsive thrust into mechanical torque. Rotating the entire aircraft tends to reduce or eliminate the need for complex combiner/reduction transmissions. A long torsion tube, i.e., fuselage/boom, provides differential compliance between the two rotors. Two large triaxial joints at either end of the boom tend to eliminate the need for conventional flight control apparatus within the wings, thus allowing the wings to also serve as rotors. In an example embodiment, on-demand service of an eVTOL aircraft of the present disclosure does not require landing gear. In an example embodiment, on-demand service of an eVTOL aircraft of the present disclosure does not require the e VTOL aircraft to return to a storage system (e.g., a silo) before continuing or starting a new mission.

In accordance with various example embodiments, the vast majority (e.g., 91%) of the aircraft's mass can be located near the axis of rotation (e.g., within 18.00 inches (45.72 cm) of the axis of rotation) of an eVTOL aircraft of the present disclosure. The remaining mass (e.g., the remaining 9%) can consist of rotorwings, stator-vanes, propulsion and power turbine blades. The inherent gyroscopic stability of the design tends to allow independent out of phase pitch moments to be introduced into the cyclic (i.e., pitch angle control or feathering angle control of each main rotor blade—also referred to herein as a wing or a rotorwing) for better control of the co-rotating design.

An eVTOL aircraft of the present disclosure can include independently actuated power-turbine/diverter blades for improved positioning, in accordance with various embodiments. The electric propulsion system of the present disclosure can seamlessly mirror load change allowing high frequency shuttering of the turbine blades without loss of inertia. Rapid shuttering tends to create pulse thrust moments for more precise altitude control. In an example embodiment, precise altitude control using systems and methods of the present disclosure reduce payload coupling duration.

After the SkyBoom of the present disclosure attaches to a payload, motors located in the lower joint can initiate spin-up. At or around a predetermined rotational speed (e.g., 1.0 rotation per second) the rotorwings can deploy and cyclic control is acquired. As the rotorwings take up load, the power turbines continue to transfer energy into the aircraft until max RPM is reached. Upon takeoff, angular spin momentum kinetic energy stored in the whole of the aircraft can be rapidly converted into thrust. The payload and rudder may not rotate with the aircraft and instead may maintain a desired azimuth. The spin-up duration can be reduced by prolonging rotorwing deployment.

The electric propulsion motors can cycle at peak power by using the rotating mass of the aircraft as a flywheel to store energy. Collective adjustments maintain lift as the aircraft cycles through RPM change.

In an example embodiment, an eVTOL aircraft of the present disclosure is configured such that the battery, when rotating with the skyboom, stores both chemical energy and kinetic energy. In an example embodiment, an eVTOL aircraft of the present disclosure provides increased efficiency and lift capacity per power/mass ratio. Co-rotation and rotor-spacing deliver at least the efficiency of a conventional (horizontal) tandem rotor design.

An eVTOL aircraft of the present disclosure eliminates transitional flight problems and logistical issues. Conversion to wing-borne flight can begin with rotation of the propulsion system at the upper joint. The choreographed movement causes a dissymmetry in velocity between either end of the aircraft effectively isolating the payload from conversion anomalies (the pendulum effect). An eVTOL aircraft of the present disclosure is designed for silo storage thereby eliminating the need for airports/skyports. On-demand flight provides the lowest possible response latency. The silo storage containers double as launch systems, utilizing the propulsion system as a compressor. Assisted launch allows an eVTOL aircraft of the present disclosure to quickly reach cruise altitude with minimal energy loss. The system allows silos to be placed further away from high traffic areas with minimal effect on response latency, a complete logistical solution.

An eVTOL aircraft of the present disclosure can be designed for high volume production (e.g., no vacuum bagging, no autoclaves, direct electrical pathway, modular design, etc.)

FIG. 1A through FIG. 1G illustrate a skyboom-based electric vertical takeoff and landing (eVTOL) aircraft 50. eVTOL aircraft 50 is an aircraft formed around a fuselage 52 (also referred to herein as a skyboom or a boom). The top end of skyboom 52 has upper wings 54 attached via an articulated joint 56. Each upper wing 54 is attached to articulated joint 56 via a hinge 58. A rotor stanchion 60 extends from joint 56 and holds a propulsion system 100. The bottom end of skyboom 52 has lower wings 74 attached via articulated joint 76. Each lower wing 74 is attached to articulated joint 76 via a hinge 78. In this regard, articulated joint 56 may be disposed at a first end (also referred to herein as a top end or a front end) of skyboom 52 and joint 76 may be disposed at a second end (also referred to herein as a bottom end or an aft end) of skyboom 52. A payload connector 80 extends down from articulated joint 76. In various embodiments, payload connector 80 includes a shaft similar to stanchion 60 and can operate as a rudder with 360 degree rotation capability.

Figure 1B:
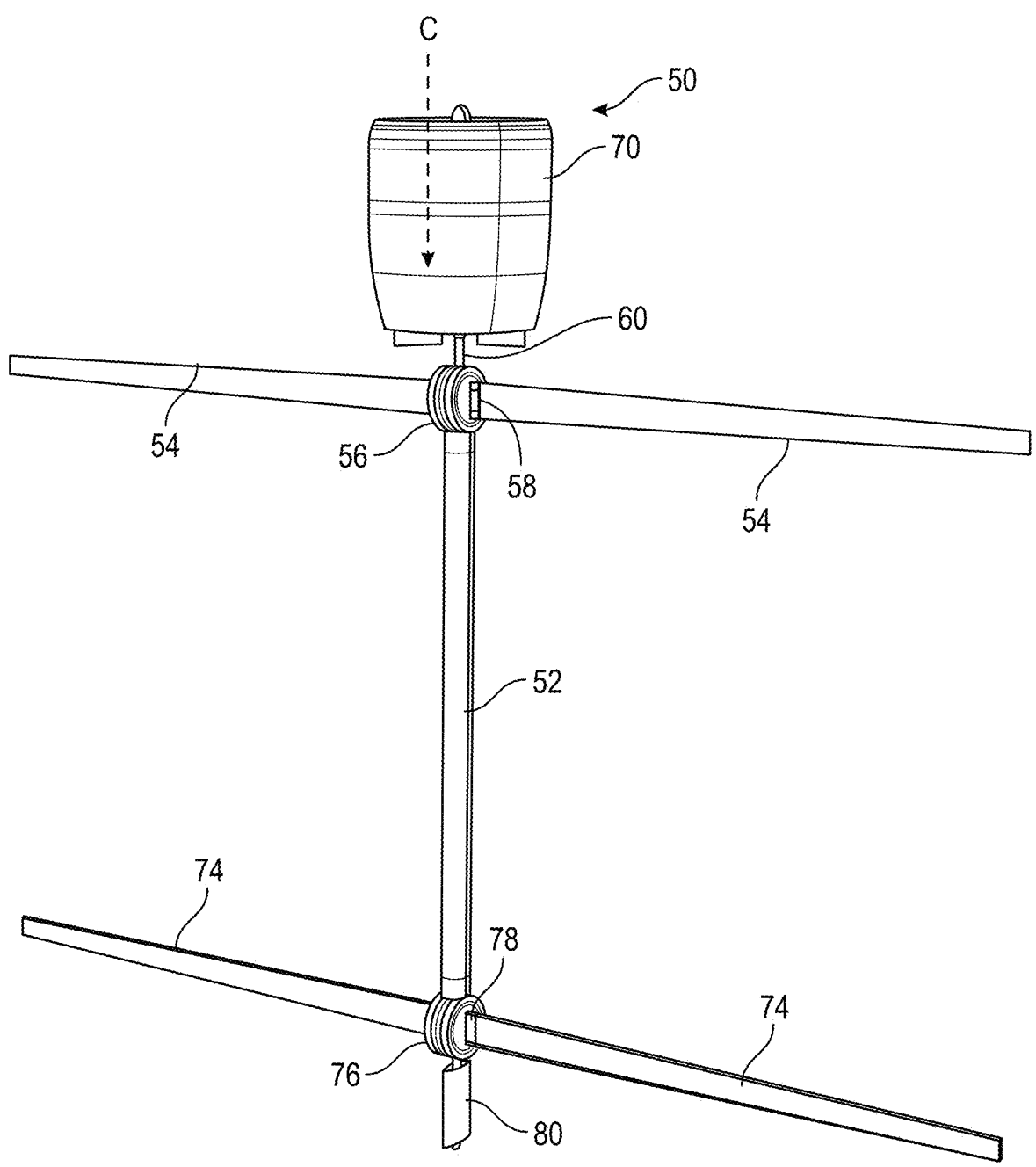
Figure 1C:
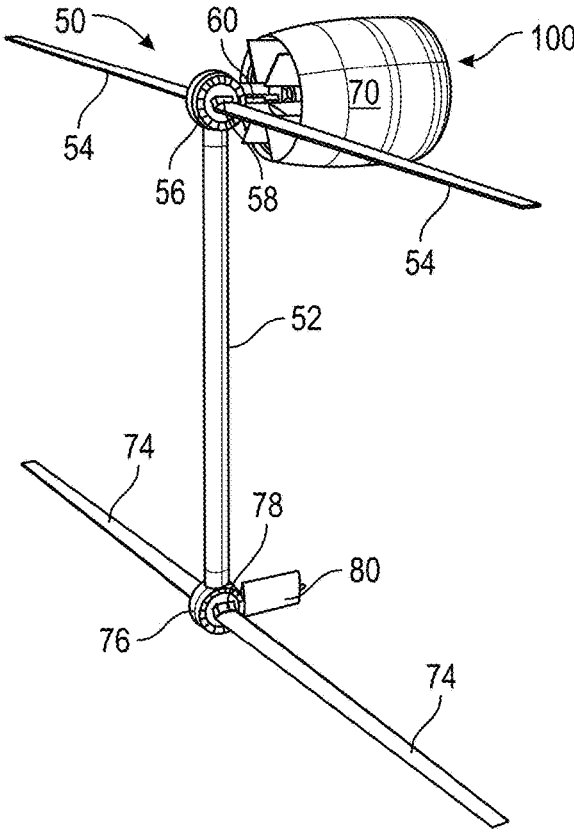

Skyboom 52 operates as the fuselage of eVTOL aircraft 50. The standard skyboom 52 can be 40 feet in length to support a combined wingspan of 160 feet for upper wings 54 and lower wings 74. In various embodiments, skyboom 52 acts as a torsion tube to accommodate differential loading between upper wings 54 and lower wings 74 (particularly when eVTOL aircraft 50 operates in rotorcraft mode). In the standard model, the combined wingspan of all four wings 54 and 74 is 100 feet: 60 feet for lower wings 74 and 40 feet for upper wings 54. Skyboom 52 houses fuel to power eVTOL aircraft 50. In the case of an all-electric eVTOL aircraft 50, skyboom 52 houses a large array of electric batteries. Standard battery weight for the all-electric eVTOL aircraft 50 can be 1,800-2,400 pounds, with an estimated total eVTOL weight of 3,600 to 4,000 pounds. The size, length, and battery capacity of skyboom 52 and wings 54 and 74 are all scalable as desired to meet flight requirements for a given situation. Skyboom 52 has a symmetric airfoil shape to provide a large battery storage capacity in a low drag structure. In hybrid embodiments, skyboom 52 can house both electric batteries and liquid fuel. In various embodiments, other types of power storage can be used as a power source for eVTOL aircraft 50, such as fuel cells and capacitors, among others.

eVTOL aircraft 50 has two pairs of long high aspect ratio wings, upper wings 54 at the top of skyboom 52 and lower wings 74 at the bottom of skyboom 52. In various embodiments, upper wings 54 are optional, and some embodiments are capable of horizontal cruising with only lower wings 74. In other embodiments, smaller canards are used for upper wings 54. Articulated joints 56 and 76 allow wings 54 and 74, respectively, to rotate about an axis through the lengths of the wings as illustrated in FIG. 1B. Wings 54 and 74 are attached to circular rails, circular gears, or a ring gear within joints 56 and 76, respectively, that allow 360-degree rotation of the wings, about an axis down the length of the respective wings, using gears and electric drive motors. Rotation of wings 54 and 74 can also be passive. A locking mechanism can be used to temporarily disallow rotation of wings 54 and 74. Wings 54 and 74 may have additional control surfaces built into the wings, such as flaps or ailerons, for in-flight control. Otherwise, rotation via joints 56 and 76 can be used for in-flight control.

Articulated joint 56 allows wings 54 to rotate independently from each other. Articulated joint 76 allows wings 74 to rotate independently from each other. Rotating wings on opposite sides of skyboom 52 in opposite directions will effectively turn the wings into rotors to facilitate autorotation. In various embodiments, wing tips could be fitted with rockets to initiate autorotation. Rockets can be mounted directly to wing tips or within the wing structure with plumbing to a wing tip nozzle. In various embodiments, autorotation could be started by pressurized air jets. In various embodiments, autorotation could be started by rotating payload connector 80 (and the associated payload connected thereto if present), via articulated joint 76, which torque force is reacted through skyboom 52 causing the skyboom 52 and associated wings 54, 74 to counterrotate with respect to the payload connector 80. Autorotation can be particularly useful in reduced power or loss of power situations. In autorotation, the entire eVTOL aircraft 50 rotates, except for payload connector 80, in response to surrounding air moving upward relative to the eVTOL. In autorotation, skyboom 52 rotates about an axis through the length of the skyboom. An attached load could be geared through payload connector 80 to maintain set position or rotate in an opposite direction to induce a stabilizing effect.

Articulated joint 56 also allows stanchion 60, and thus propulsion system 100, to rotate relative to skyboom 52. As with wings 54, rotor stanchion 60 is attached to a circular rail or geared component within articulated joint 56 to allow rotation and may be powered by an electric drive motor and gears. Rotation of propulsion system 100 facilitates transition between horizontal and vertical flight by tilting thrust toward the desired direction of travel. Rotation of propulsion system 100 relative to skyboom 52 can be passive. With the rotor assembly dragging the skyboom behind, the wings provide lift to naturally bring eVTOL aircraft 50 into a horizontal posture. A locking mechanism (e.g., the collective cyclic-damping control mechanism(s) as described in greater detail herein) can be used to temporarily disallow rotation of propulsion system 100.

Articulated joint 76 allows connector 80 to rotate relative to skyboom 52. Connector 80 is attached to a circular rail or geared component within articulated joint 76 and powered by a driver motor and gears. Rotation of the connector 80 with respect to skyboom 52 can be passive, with a load causing connector 80 to remain hanging down vertically from articulated joint 76 as eVTOL aircraft 50 transitions between vertical and horizontal flight. When connector 80 is loaded and hangs down, the connector 80 stabilizes the flight of eVTOL aircraft 50 and functions as a tail rudder. When eVTOL aircraft 50 is unloaded, connector 80 can be extended upward or downward during horizontal flight as a vertical stabilizer. A locking mechanism can be used to temporarily disallow rotation of connector 80. In an example embodiment, the eVTOL aircraft 50 comprises a double-jointed design, with articulated joints at both ends, configured to allow counter-force to be applied to the propulsion system, reducing moments of instability during transition between horizontal and vertical flight.

Figure 1D:
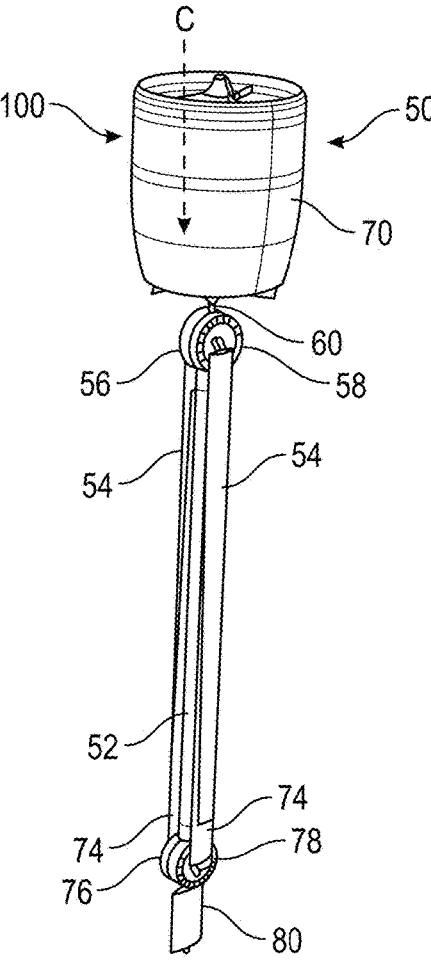

The vertical design of eVTOL aircraft 50 with skyboom 52 provides a base structure to accommodate long folding wings 54 and 74 deployed from joints 56 and 76. Hinge 58 on joint 56 allows wings 54 to fold down onto skyboom 52, and hinge 78 on joint 76 allows wings 74 to fold up onto skyboom 52, as shown in FIG. 1D. In some embodiments, one or more sets of wings attached to skyboom 52 can be fixed rather than rotatable and foldable. Additional active wings, rudders, and other control surfaces can be mounted to skyboom 52 as desired for additional lift and control.

In some embodiments, upper wings 54, lower wings 74, or both can have a variable geometry. In one embodiment, hinges 78 allow lower wings 74 to sweep forward, in a similar rotation direction as classic variable sweep aircraft wings. Wings 74 would end up being oriented parallel to skyboom 52 as in FIG. 1D, but rotated approximately 90 degrees about an axis through the length of the wings so that the width of the wing extends out from the skyboom. Wings 74 would then operate similar to a long delta wing or chine. The tips of wings 74 can attach to the skyboom 52, so that articulated joint 76 warps wings 74 as a control surface. Upper wings 54 could be swept backwards similarly instead of or in addition to lower wings 74.

Figure 1E:
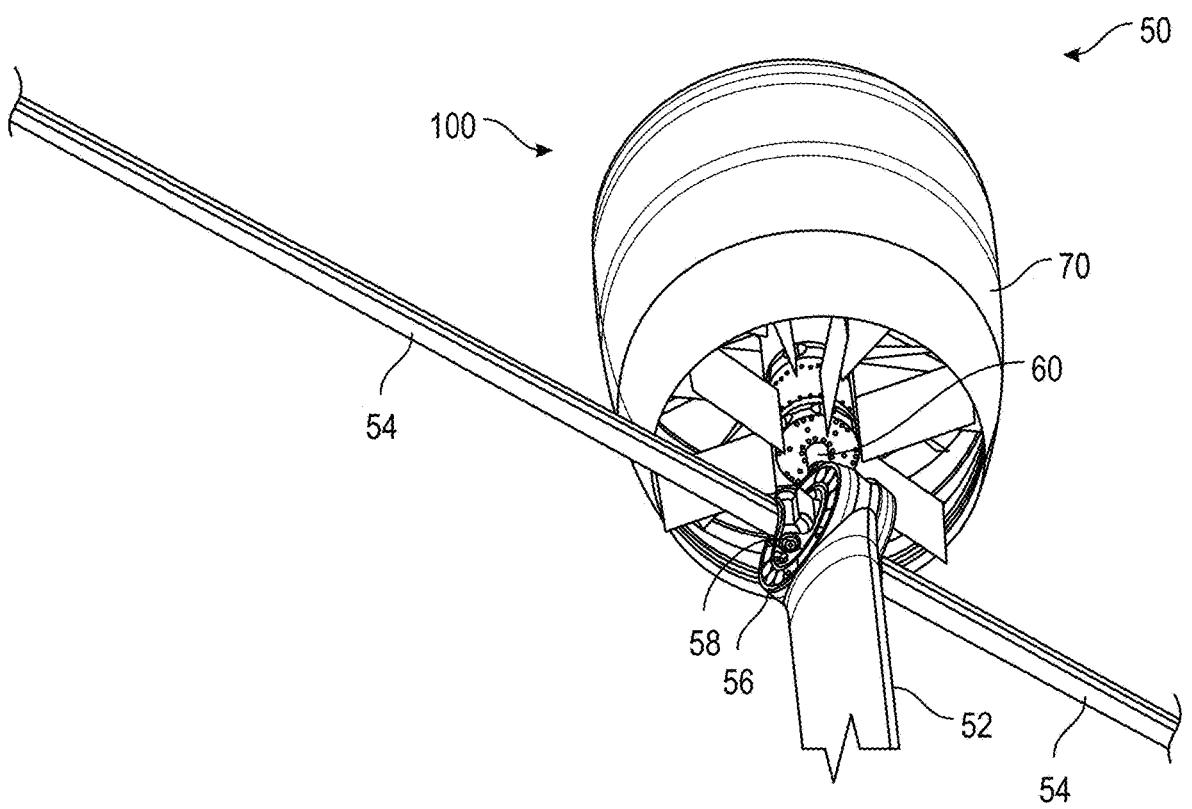
Figure 1F:
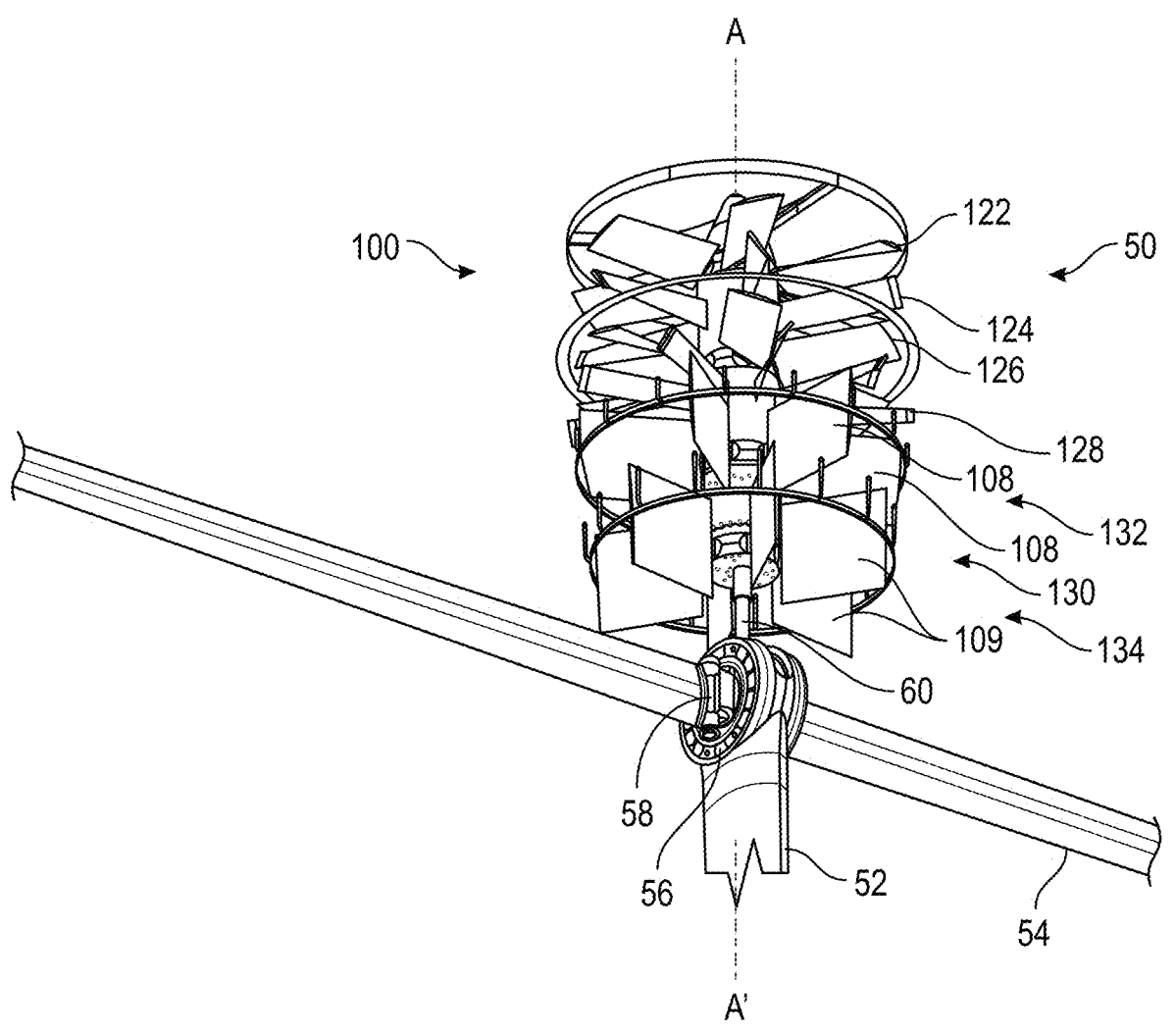

FIG. 1E and FIG. 1F illustrate perspective views from below propulsion system 100 with duct 70 installed and with duct 70 omitted, respectively, for case of illustration. Propulsion system 100 can include one or more rotor blades 122, 126 which are mounted to and configured to rotate about stanchion 60. Propulsion system 100 can further include one or more stator vanes 124, 128.

Propulsion system 100 can further include a dual power turbine 130 comprising a first power turbine module 132 and a second power turbine module 134. Dual power turbine 130 can be located downstream from rotor blades 122, 126. First power turbine module 132 can include one or more turbine blades 108. Second power turbine module 134 can include one or more turbine blades 109. In various embodiments, the first power turbine module 132 can be located forward of second power turbine module 134. A first plurality of turbine blades 108 of first power turbine module 132 can be configured to rotate about axis A-A' and a second plurality of turbine blades 109 of second power turbine module 134 can be configured to rotate about axis A-A'. In various embodiments, first plurality of turbine blades 108 is configured to rotate about axis A-A' in a first rotational direction and second plurality of turbine blades 109 is configured to rotate about axis A-A' in a second, opposite rotational direction. Stated differently, first plurality of turbine blades 108 and second plurality of turbine blades 109 may counterrotate about axis A-A'.

In various embodiments, turbine blades 108 are mounted to, and configured to rotate with, stanchion 60. In various embodiments, turbine blades 108 can be configured to rotate together with stanchion 60 with respect to propulsion system 100 (e.g., with respect to duct 70). In this manner, propulsion system 100 may drive rotation of the skyboom 52 by directing a core air flow through the core flow path C over the first plurality of turbine blades 108 and second plurality of turbine blades 109 to cause the first plurality of turbine blades 108 and second plurality of turbine blades 109 to rotate with respect to the propulsion system 100. Core air flows through propulsion system 100 (i.e., through duct 70) and is expelled from the duct 70 at an outlet or exit surrounding second plurality of turbine blades 109. In this regard, turbine blades 109 can be disposed at an outlet of the propulsion system 100 (i.e., at an outlet of the duct 70).

Propulsion system 100 can include a first set of rotor blades 122 and a second set of rotor blades 126 disposed axially from the first set of rotor blades 122. Rotor blades 122 and 126 may be mounted to and rotate about stanchion 60. Rotor blades 122 and 126 may be configured to counter-rotate to keep the overall combined rotational velocity of the rotor blades 122, 126 approximately zero. Stated differently, rotor blades 122 can be configured to rotate in a first rotational direction and rotor blades 126 can be configured to rotate in a second rotational direction, opposite the first rotational direction, at the same rotational velocity as the rotor blades 122. In various embodiments, the rotor blades 122 and 126 may be configured to co-rotate, wherein stabilization of the aircraft can be achieved with the turbine blades 108, 109. Individual rotor blades 122 and/or 126 can be driven with one or more electric motors stacked on a common shaft. Stacking electric motors provides redundancy and reduces magnetic saturation within the motors during high current draw situations. Stacking motors also allows switching between motors to reduce thermal loading and improve efficiency during horizontal winged flight. Propulsion system 100 may further include a shroud or duct 70 (also referred to as a nacelle) mounted to stanchion 60 and extending around blades 122, 126. Center attachment of the propulsion system tends to reduce weight and improve the stability and rigidity of duct 70. The rotor blades 122 and 126 drive air along a core flow path C (see FIG. 1E) defined by the duct 70 for compression and expansion through the duct for generating thrust for the eVTOL aircraft 50 and, when desired, driving rotation of the first plurality of turbine blades 108 and second plurality of turbine blades 109. In various embodiments, a first plurality of stator vanes 124 are disposed downstream from blades 122. Stator vanes 124 can be disposed between blades 122 and blades 126. In various embodiments, a second plurality of stator vanes 128 are disposed downstream from blades 126. Stator vanes 128 can be disposed between blades 126 and first power turbine module 132.

Figure 1G:
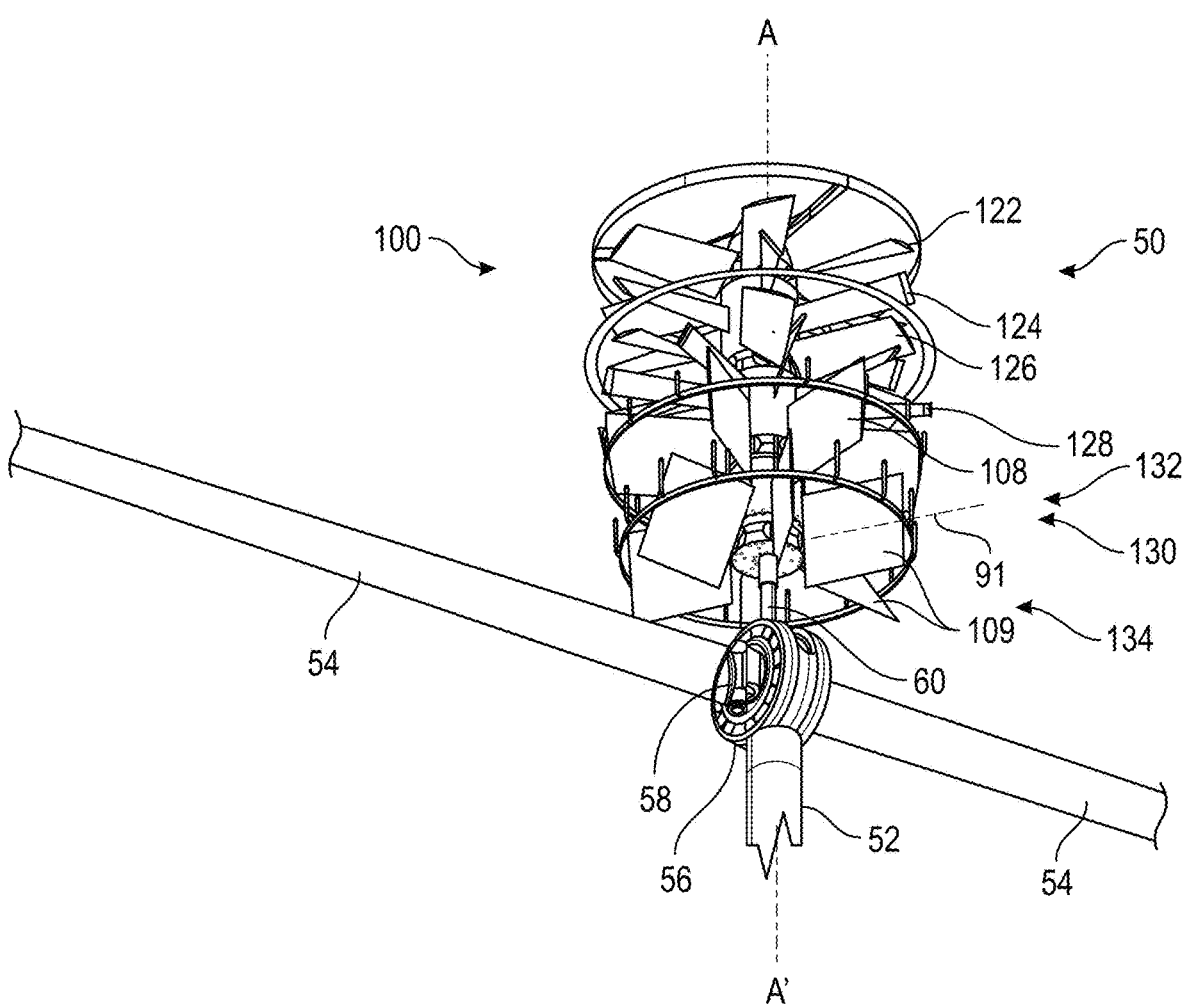

In various embodiments, first plurality of turbine blades 108 and second plurality of turbine blades 109 are configured to control movement of eVTOL aircraft 50 by displacing moving air from blades 122, 126. Stated differently, first plurality of turbine blades 108 and second plurality of turbine blades 109 may be configured to provide thrust vectoring. In various embodiments, a portion of each of the second plurality of turbine blades 109 may extend from the duct 70 to allow for greater directional vectoring. Positioning the second plurality of turbine blades 109 to extend from duct 70 tends to increase control of directional vectoring at the expense of performance when operating as a power turbine. In this regard, the percentage of turbine blade 109 disposed within the duct 70 versus the percentage of turbine blade 109 extending from the duct 70 may be optimized as desired. In various embodiments, more of the turbine blade 109 is disposed within duct 70 than that which extends from duct 70. In various embodiments, the turbine blades 108 and/or turbine blades 109 may be rotated about stanchion 60 to modify the direction that moving air is displaced relative to skyboom 52. Each turbine blade 108 and/or each turbine blade 109 may be rotated about a longitudinal axis through the lengths thereof (e.g., FIG. 1G illustrates turbine blade 109 rotated about longitudinal axis 91 thereof). Each turbine blade 108 and/or each turbine blade 109 may be rotated independently of each other. In various embodiments, turbine blades 108 are rotated in a first rotational direction and turbine blades 109 are rotated in a second rotational direction opposite from the first rotational direction to spin eVTOL aircraft 50 in vertical flight.

eVTOL aircraft 50 has high aspect ratio wings, an aerodynamic design, and large energy storage capacity within skyboom 52, which provide excellent efficiency and allows the eVTOL aircraft 50 to operate for long periods of time before needing recharging or refueling. The efficient aerodynamic design of the eVTOL aircraft 50 structure in combination with the unobstructed air flow around the propulsion system provide greater cruise and top speed capability independent of the chosen propulsion system. The noise reduction attributes of the ducted rotor propulsion design coupled with the propulsion system's location 40 feet or more above the payload combine to reduce noise levels. The location of the propulsion system and length of skyboom 52 allows for a long, efficient wingspan and larger diameter rotor blades 122, 126, whether ducted or not. The simple design of eVTOL aircraft 50 helps streamline the manufacture of carbon fiber components. However, eVTOL aircraft 50 is so efficient that the aircraft could also be made out of aluminum and still fly long enough on a single battery charge to be commercially viable. Moreover, any suitable material may be used to make the eVTOL aircraft 50.

With reference to FIG. 2A through FIG. 2E, an articulated joint 400 is illustrated, in accordance with various embodiments. Articulated joint 400 is illustrated as a lower articulated joint, though upper articulated joint 56 or lower articulated joint 76 as described with respect to FIG. 1A through FIG. 1G may be similar to articulated joint 400. In this regard, and with combined reference to FIG. 1A and FIG. 2A, when installed at the aft end or bottom end of the skyboom 52, articulated joint 400 may control the positions of the skyboom 52 with respect to payload connector 80 or the positions of the lower wings 74 with respect to the skyboom 52. When installed at the forward end or top end of the skyboom 52, articulated joint 400 may control the positions of the skyboom 52 with respect to propulsion system 100 or the positions of the upper wings 54 with respect to the skyboom 52.

Figure 2A:
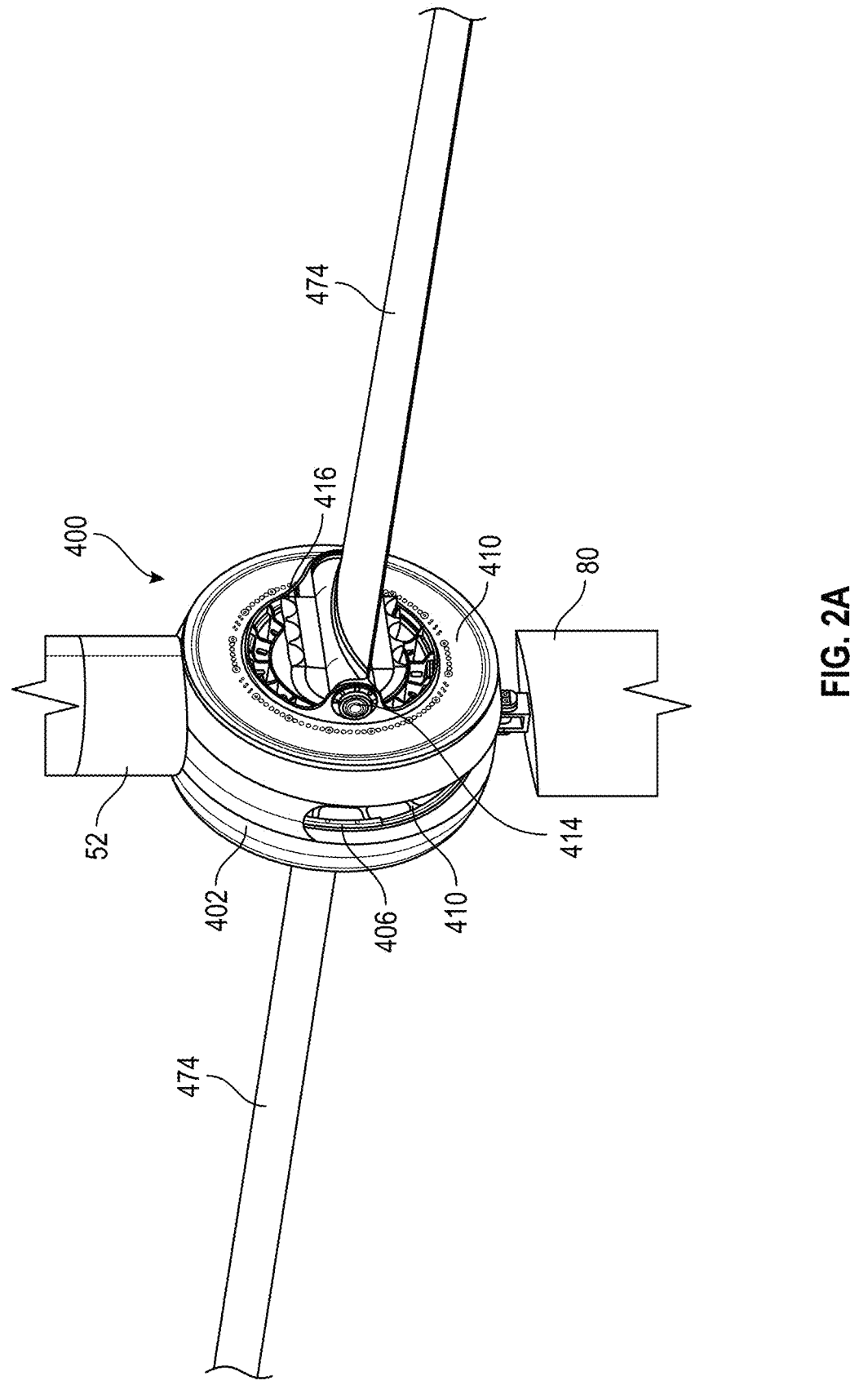
FIG. 2A and FIG. 2B are perspective views of a lower/aft articulated joint with a cover plate installed and the cover plate omitted, respectively, in accordance with various embodiments.
Figure 2B:
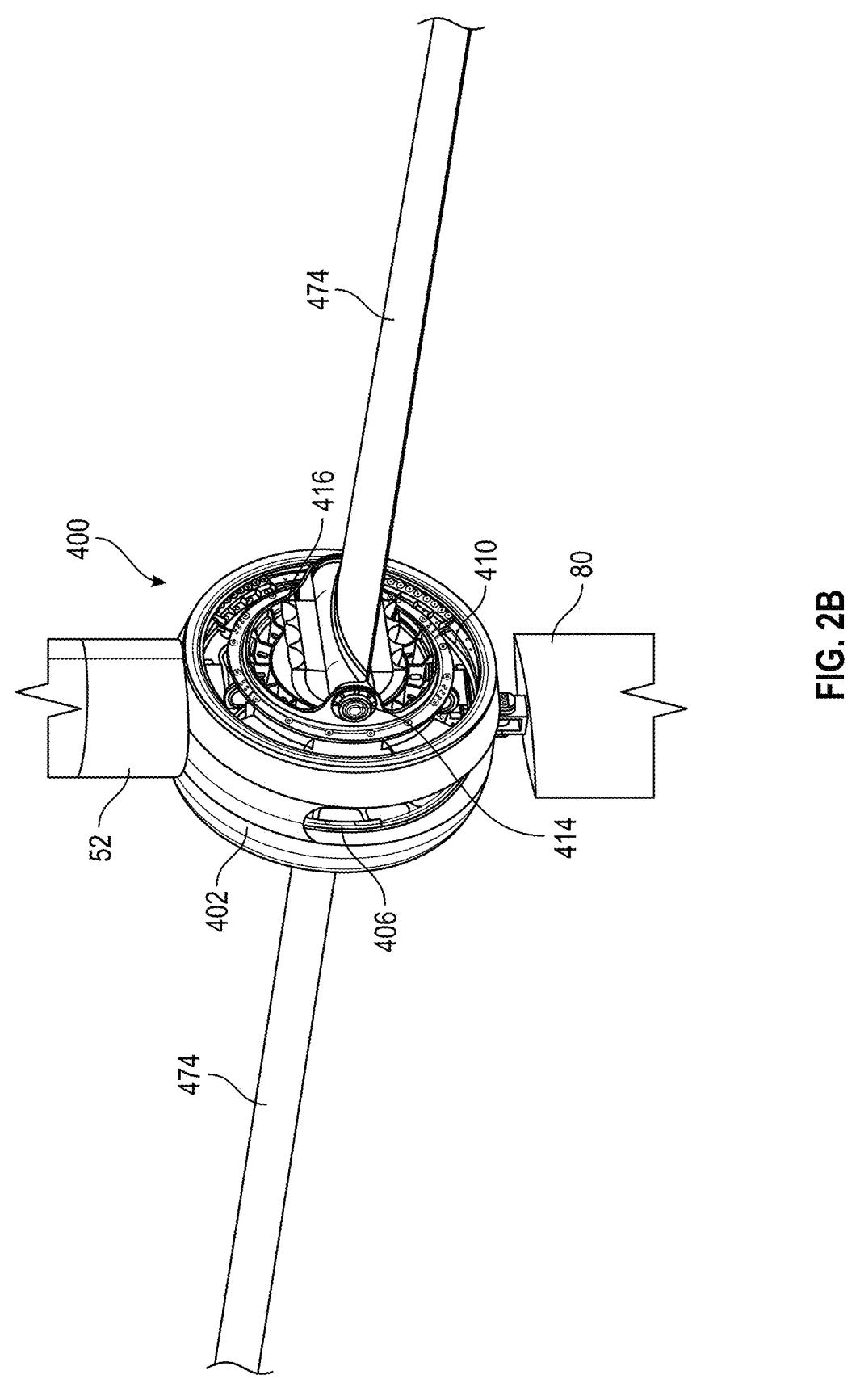
Figure 2C:
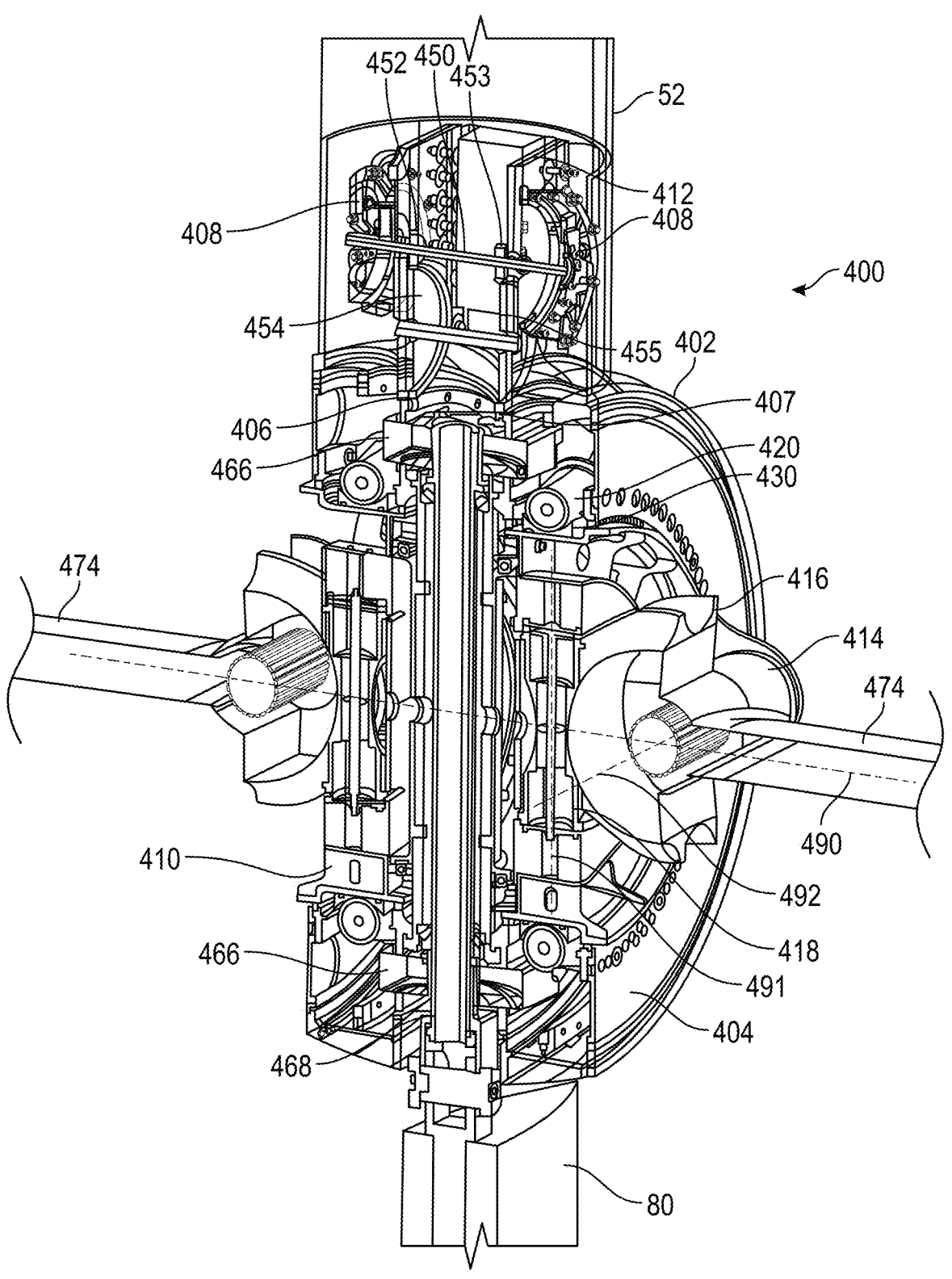
FIG. 2C is a section view of the lower/aft articulated joint of FIG. 2A, in accordance with various embodiments.

In various embodiments, articulated joint 400 comprises a shell 402 surrounding a frame 410 to which wings 474 are pivotally mounted. In various embodiments, the shell 402 is formed as a composite shell (e.g., fiber-reinforced carbon fiber). FIG. 2A illustrates a cover plate 404 installed for protecting various internal components of articulated joint 400 against foreign objects (e.g., debris). Cover plate 404 may comprise an annular shape. FIG. 2B illustrates articulated joint 400 with cover plate 404 omitted for case of illustration.

In various embodiments, one or more driven gears (e.g., driven gear 406 and driven gear 407) are coupled to frame 410 for providing a drive mechanism to rotate frame 410 about axis 490. In various embodiments, the one or more driven gears (e.g., driven gear 406 and driven gear 407) can rotate frame 410 about axis 490 with respect to skyboom 52. A plurality of electric motors 408 (also referred to herein as third electric motors) can be operatively coupled to driven gear 406 and/or driven gear 407, whereby rotation of the output shaft 450 by electric motors 408 drives rotation of driven gear 406, driven gear 407, and frame 410 about axis 490 with respect to skyboom 52. In various embodiments, electric motors 408 meshingly engage with driven gear 406 and driven gear 407 via a transmission comprising output shaft 450, one or more output shaft gears (e.g., output shaft gear 452 and output shaft gear 453), and one or more intermediate gears (e.g., intermediate gear 454 and intermediate gear 455). Output shaft gear 452 and output shaft gear 453 are mounted to output shaft 450 and rotate together therewith. Output shaft gear 452 and output shaft gear 453 can meshingly engage with intermediate gear 454 and intermediate gear 455, respectively. Intermediate gear 454 and intermediate gear 455 can meshingly engage with driven gear 406 and driven gear 407, respectively. In this manner, motors 408 can turn output shaft 450 together with output shaft gear 452 and output shaft gear 453 about a first axis, which in turn drives rotation of intermediate gear 454 and intermediate gear 455 about a second axis, which in turn drives rotation of driven gear 406 and driven gear 407 together with frame 410 about axis 490 with respect to skyboom 52.

In various embodiments, the plurality of motors 408 are DC electric motors. The motors 408 can be mounted to shell 402 via one or more attachment flanges 412 extending from shell 402. In this regard, activating motors 408 causes the frame 410 to rotate with respect to the shell 402. The skyboom 52 can be attached to the shell 402. For example, skyboom 52 may be mounted to attachment flanges 412. In this regard, activating motors 408 causes the frame 410 to rotate with respect to the skyboom 52. It should be understood that, when used at the first/upper/forward end of the skyboom 52 (i.e., articulated joint 56), the payload connector 80 can be replaced with stanchion 60.

In various embodiments, a wing 474, such as wing 74 or wing 54 as described with respect to FIG. 1A through FIG. 1G, is pivotally coupled to articulated joint 400 via hinge 414. Hinge 414 comprises dihedral drive lobes 416 extending from hinge 414 opposite wing 474. Articulated joint 400 further comprises one or more (e.g., one, two, three, or more) dihedral drive motors 418 (also referred to herein as second electric motors) meshingly engaged to the dihedral drive lobes 416. In this regard, a plurality of dihedral drive motors 418 may drive the rotation of wing 474 about hinge 414 (i.e., about axis of rotation 492, also referred to herein as a lateral axis) to adjust the dihedral (or anhedral) of wing 474. In various embodiments, each dihedral drive motor 418 is a globoid motor. In various embodiments, the axis of rotation 491 of each dihedral drive motor 418 is oriented perpendicular to the axis of rotation 492 of wing 474; though in various embodiments the axis of rotation of each dihedral drive motor 418 can be at a non-orthogonal orientation with respect to the axis of rotation of wing 474. Each dihedral drive motor 418 can be disposed between two dihedral drive lobes 416 whereby the dihedral drive motor 418 meshingly engages with hinge 414.

In various embodiments, articulated joint 400 further comprises one or more electric drive motors 420 (also referred to herein as angle of attack (AOA) drive motors or first electric motors) for adjusting the AOA of wing 474—i.e., for rotating wing 474 about its longitudinal axis 490. Drive motors 420 may provide collective pitch control and cyclic control of eVTOL aircraft 50 (i.e., by rotating wing 474 about axis 490 thereby changing the mechanical pitch angle or feathering angle) during vertical flight (rotorcraft mode). Drive motors 420 may be mounted to frame 410. Drive motors 420 may comprise globoid gears meshingly engaged with driven gear 430. Frame 410 may comprise an annular tube with annular flanges extending therefrom whereby various components are mounted to the frame 410.

Figure 2D:
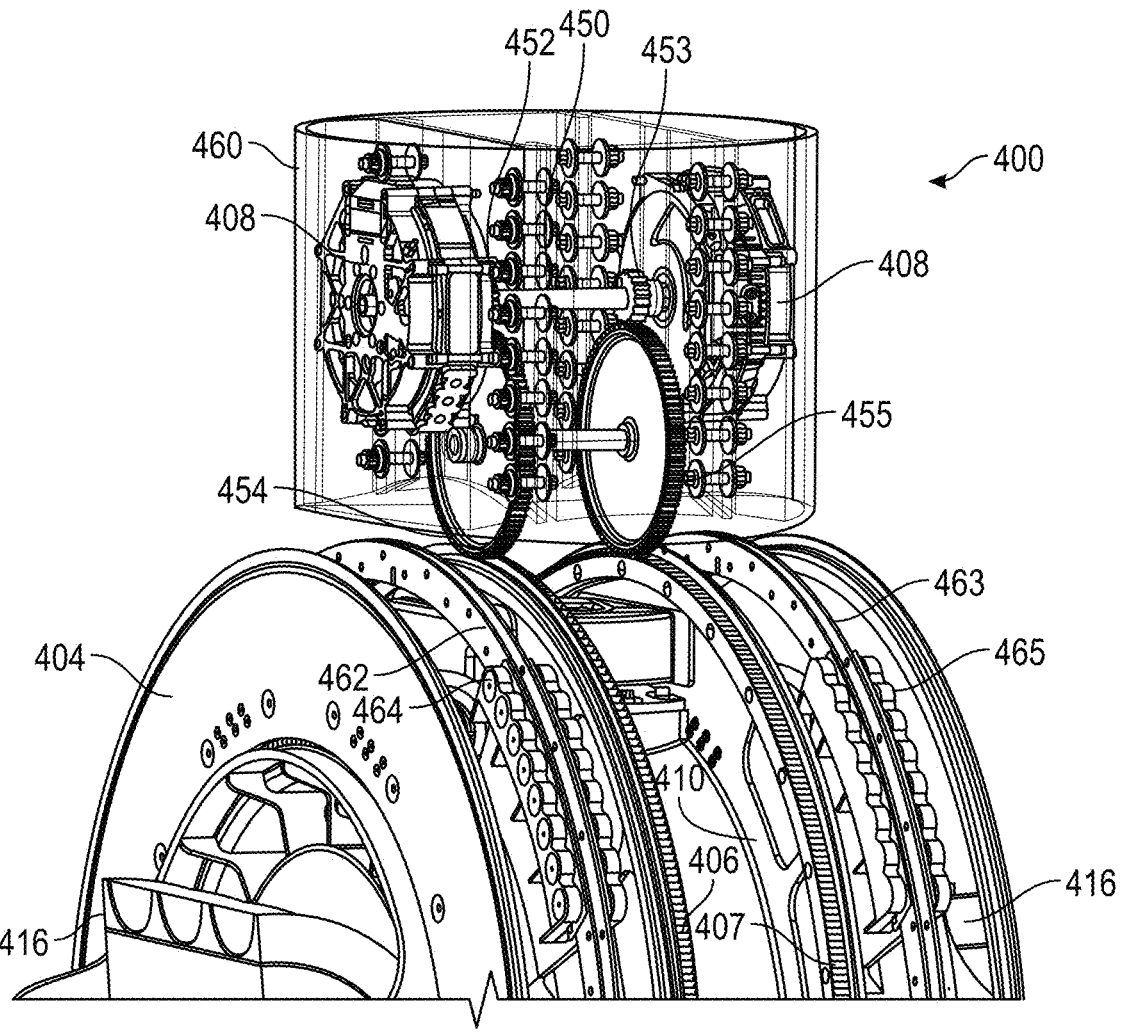
FIG. 2D is an enlarged perspective view of the lower/aft articulated joint with the shell omitted for ease of illustration, in accordance with various embodiments.

FIG. 2D illustrates articulated joint 400 with shell 402 omitted for case of clarity, in accordance with various embodiments. An attachment sleeve 460 can be fixed to attachment flanges 412 for providing a surface to which skyboom 52 mounts to articulated joint 400. In various embodiments, skyboom 52 can be moved over (i.e., surrounding) attachment sleeve 460 to mount the skyboom 52 to articulated joint 400. In various embodiments, attachment sleeve 460 is attached to attachment flanges via a plurality of fasteners (e.g., bolts or the like). In various embodiments, motors 408 are disposed within attachment sleeve 460.

In various embodiments, articulated joint 400 further includes one or more brake rotors (e.g., brake rotor 462 and brake rotor 463) are mounted to shell 402. Brake rotor 462 and/or brake rotor 463 may extend from a radially inward facing surface of shell 402. One or more disc brakes (e.g., disc brake 464 and disc brake 465) are mounted to frame 410 and configured to clamp to brake rotor 462 and brake rotor 463, respectively. In this regard, disc brake 464 and/or disc brake 465 may lock the shell 402 from rotating with respect to frame 410. Moreover, disc brake 464 and/or disc brake 465 may control and/or prevent over acceleration of the rotational velocity of shell 402 with respect to frame 410. Disc brake 464 and/or disc brake 465 may comprise one or more direct displacement pumps for hydraulically controlling disc brake 464 and/or disc brake 465.

Electric motors 408 engage driven gear 406 and/or driven gear 407 to control positioning of propulsion system 100 with respect to skyboom 52 (when used in the upper articulated joint 56) or to control positioning of payload connector 80 with respect to skyboom 52 (when used in the lower articulated joint 76), for example when transitioning between vertical and horizontal flight, in accordance with various embodiments. In various embodiments, a plurality of disc brakes 464 are disposed circumferentially about frame 410. In various embodiments, each disc brake 464 is equidistantly spaced around frame 410; though in various embodiments the spacing of disc brake 464 varies. In various embodiments, a plurality of disc brakes 465 are disposed circumferentially about frame 410. In various embodiments, each disc brake 465 is equidistantly spaced around frame 410; though in various embodiments the spacing of disc brake 465 varies.

Figure 2E:
FIG. 2E is a perspective view of the lower/aft articulated joint with a portion of the articulated joint expanded to an assembly view, in accordance with various embodiments.

With reference to FIG. 2E, an assembly view of articulated joint 400 is illustrated, in accordance with various embodiments. In various embodiments, articulated joint 400 further comprises a bearing assembly including a bearing 422, an inner sleeve 424, and an outer sleeve 426. In various embodiments, inner sleeve 424 is mounted to stanchion 60. Inner sleeve 424 can include a depressed surface for receiving a portion of the stanchion 60 (e.g., to extend around half of the stanchion 60). For example, inner sleeve 424 may be clamped to stanchion 60 by coupling first inner sleeve 424 to a second inner sleeve 425 located opposite the stanchion 60 from first inner sleeve 424. For example, first inner sleeve 424 may be bolted to second inner sleeve 425, though various means of mounting first inner sleeve 424 to second inner sleeve 425 may be suitable. In this regard, it should be understood that, although only one side of the articulated joint 400 is described in detail herein, it should be understood that articulated joint 400 is mirrored such that the other side of articulated joint 400 is structurally similar. In this regard, while only one bearing assembly is described in detail, a second bearing assembly is located opposite the stanchion from the first bearing assembly in a mirrored fashion, and so on and so forth with all or substantially all of the articulated joint 400 components. It should be appreciated, however, that there may be only one frame 410 configured to receive the stanchion 60 therethrough and having a mirrored geometry; though it is contemplated herein that frame 410 may be formed as a two-piece component that can be coupled together during installation. It should be further appreciated that there may be only one shell 402 configured to receive the stanchion 60 therethrough and having a mirrored geometry; though it is contemplated herein that shell 402 may be formed as a two-piece component that can be coupled together during installation.

In various embodiments, inner sleeve 424 is fixed with respect to stanchion 60. The main thrust bearing 422 may be placed over inner sleeve 424. In this manner, bearing 422 may be in concentric alignment with inner sleeve 424. Outer sleeve 426 may be placed over bearing 422. In this manner, bearing 422 may be in concentric alignment with outer sleeve 426. In this regard, outer sleeve 426 may rotate with respect to inner sleeve 424. Bearing 422 may transfer loads between inner sleeve 424 and outer sleeve 426. Bearing 422 may allow for smooth rotation of outer sleeve 426 with respect to inner sleeve 424. In various embodiments, bearing 422 comprises a rolling ball bearing. In various embodiments, outer sleeve 426 is a two piece component configured to clamp around bearing 422; though it is contemplated herein that outer sleeve 426 may be formed as a single piece.

In various embodiments, a hinge sleeve 428 may be translated over outer sleeve 426 and coupled thereto. For example, hinge sleeve 428 may be bolted to outer sleeve 426. In this manner, hinge sleeve 428 can be rotatably coupled to inner sleeve 424. A driven gear 430 (also referred to herein as an AOA driven gear) may be disposed at the radially outward facing surface of hinge sleeve 428. In various embodiments, driven gear 430 is formed integrally with hinge sleeve 428. In various embodiments, driven gear 430 and hinge sleeve 428 are formed as separate pieces. Driven gear 430 is fixed with respect to hinge sleeve 428 and rotates together therewith about axis 490. In various embodiments, the driven gear 430 can be mechanically locked between the outer sleeve 426 and the hinge sleeve 428. For example, driven gear 430 may be captured between a first flange 432 of the outer sleeve 426 and a second flange 434 of hinge sleeve 428. Driven gear 430 may be formed as an annular component (e.g., an annular sleeve). In various embodiments, driven gear 430 can be cooled using a cooling fluid to maintain an acceptable temperature. Hinge sleeve 428 may be formed as an annular component (e.g., an annular sleeve).

In various embodiments, dihedral drive lobes 416 may be mounted to hinge sleeve 428 and driven gear 430. For example, hinge sleeve 428 may comprise opposing longitudinally extending flanges 436, 438 (extending along axis 490) whereby a shaft 417 of dihedral drive lobes 416 is mounted to hinge sleeve 428. The wing 474 can be mounted to the shaft 417. In this regard, opposing flanges 436, 438 can extend from the driven gear 430 whereby the wing (e.g., wing 54 or wing 74) is rotationally mounted to the articulated joint 400 via shaft 417.

In various embodiments, articulated joint 400 further includes electric motors 466 (also referred to herein as a third electric motor, a fourth electric motor, or a payload connector motor) configured to spin up skyboom 52 (see FIG. 4D) when the eVTOL aircraft is coupled to a payload/cargo. Motors 466 can be mounted to frame 410. With combined reference to FIG. 2C and FIG. 2E, motors 466 can meshingly engage payload connector shaft 468 and can be configured to rotate the frame 410 with respect to the payload connector shaft 468. The frame 410 rotates together with the skyboom 52 (e.g., about the longitudinal axis of the skyboom 52). Payload connector shaft 468 rotates together with payload connector 80. In this regard, motors 466 can be configured to rotate skyboom 52 (see FIG. 4D) with respect to payload connector 80. A payload attached to payload connector 80 may act as a counterweight which resists rotation of payload connector 80. In this regard, payload connector 80—when coupled to a payload—can react torque through motors 466 to cause skyboom 52 to rotate. In this manner, motors 466 located in the lower articulated joint 400 can act to initiate spin of skyboom 52 and maintain directional control of the payload in forward flight. Positioning of the payload clevis joint 470 can allow the skyboom 52 to rotate during forward flight. Ridged attachment to the payload tends to improve control thus allowing the eVTOL aircraft to operate at higher speeds.

Figure 3:
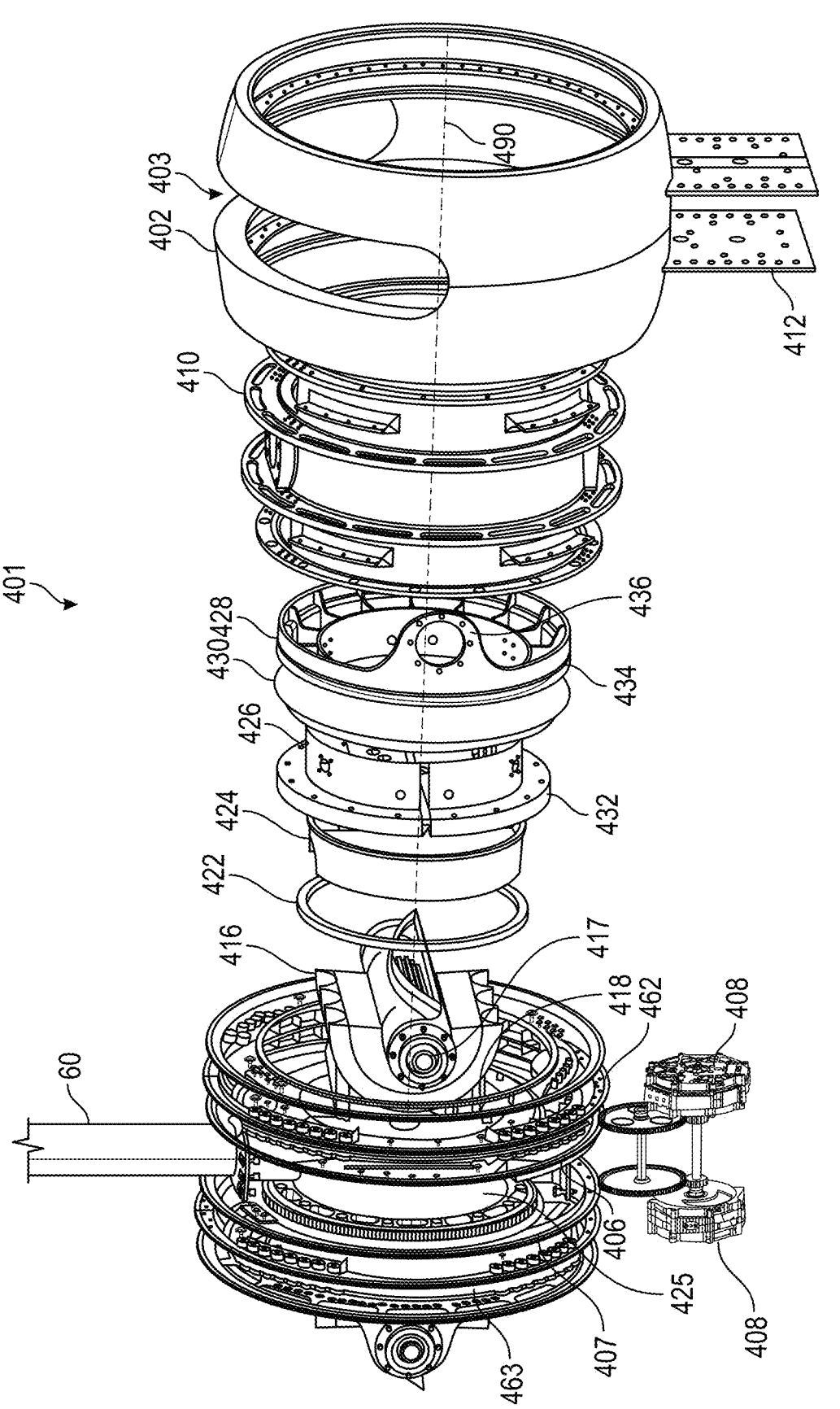
FIG. 3 is a perspective views of an upper/forward articulated joint with a portion of the articulated joint expanded to an assembly view, in accordance with various embodiments.

With reference to FIG. 3, articulated joint 401 is illustrated. Articulated joint 401 can be similar to articulated joint 400 as described with respect to FIG. 2A through FIG. 2E, except that articulated joint 401 is configured as an upper/forward articulated joint with stanchion 60 extending therefrom. In this regard, with respect to FIG. 3, elements with like element numbering, as depicted in FIG. 2A through FIG. 2E, are intended to be the same and will not necessarily be repeated for the sake of clarity.

In various embodiments, shell 402 comprises an elongated slot 403 extending circumferentially around the shell 402. In various embodiments, the elongated slot 403 extends between thirty degrees and two hundred and seventy degrees (30 deg. −270 deg.) around the shell 402, between ninety degrees and two hundred degrees (90 deg. −200 deg.) around the shell 402, or between ninety degrees and three hundred degrees (90 deg. −300 deg.) around the shell 402. Slot 403 may accommodate rotation of stanchion 60 (and/or payload connector 80 for a lower articulated joint) with respect to shell 402.

With reference to FIG. 4A through FIG. 4G, eVTOL aircraft 50 is illustrated in various positions when transitioning from a stowed state to vertical flight and/or horizontal flight, in accordance with various embodiments. In various embodiments, eVTOL aircraft is operable in a VTOL electric turbine powered mode (sec FIG. 4D), a VTOL: electric turboshaft powered—rotorwing mode (see FIG. 4E), a wing-borne: cargo & passenger transport mode (see FIG. 4G), and/or a silo-storage: on-demand logistical solution mode (see FIG. 4A). With particular focus on FIG. 4A, VTOL aircraft 50 is illustrated in a stowed position in an aircraft container 85 (e.g., a silo or the like). Aircraft container 85 may define a chamber 86 in which the eVTOL aircraft 50 is stored until it is desirable to operate eVTOL aircraft 50.

eVTOL aircraft 50 may be activated by starting the propulsion system 100. When started, electric motors may cause the rotor blades 122 and rotor blades 126 to spin, thereby generating thrust, illustrated by arrows 87. As propulsion system 100 operates, rotor blades 122, 126 may move the core air flow into chamber 86, thereby increasing the static pressure in chamber 86. In various embodiments, propulsion system 100 generates sufficient thrust 87 such

Figure 4A:
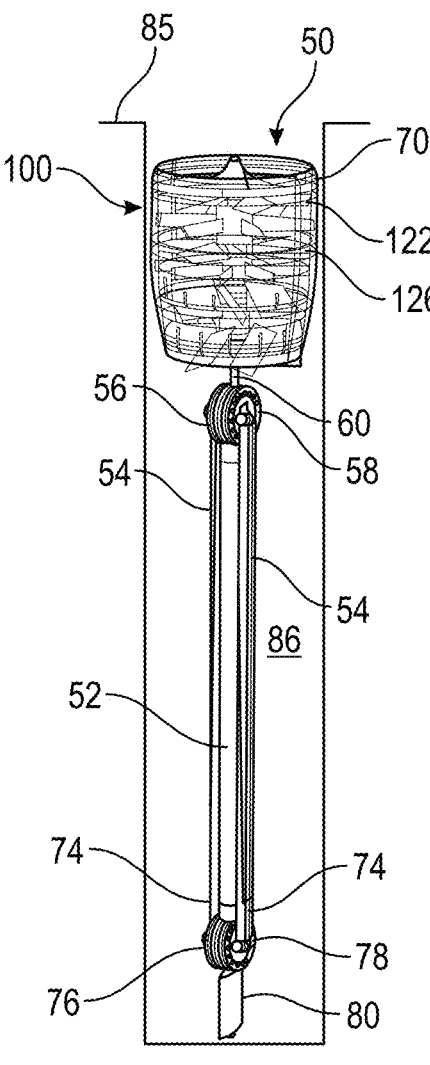
FIG. 4A is a schematic view of an eVTOL aircraft stored in a container, in accordance with various embodiments.
Figure 4B:
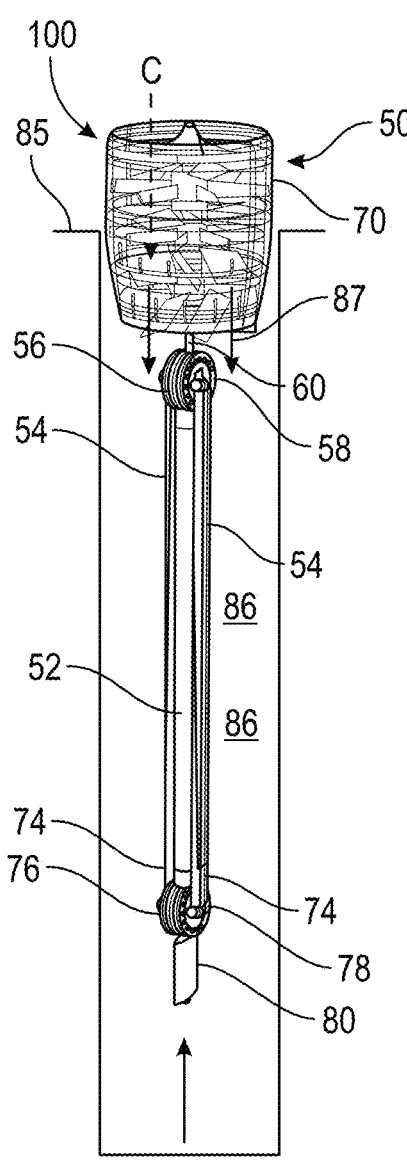
FIG. 4B and FIG. 4C are schematic views of the eVTOL aircraft taking off from the container (e.g., a silo), in accordance with various embodiments.
Figure 4C:
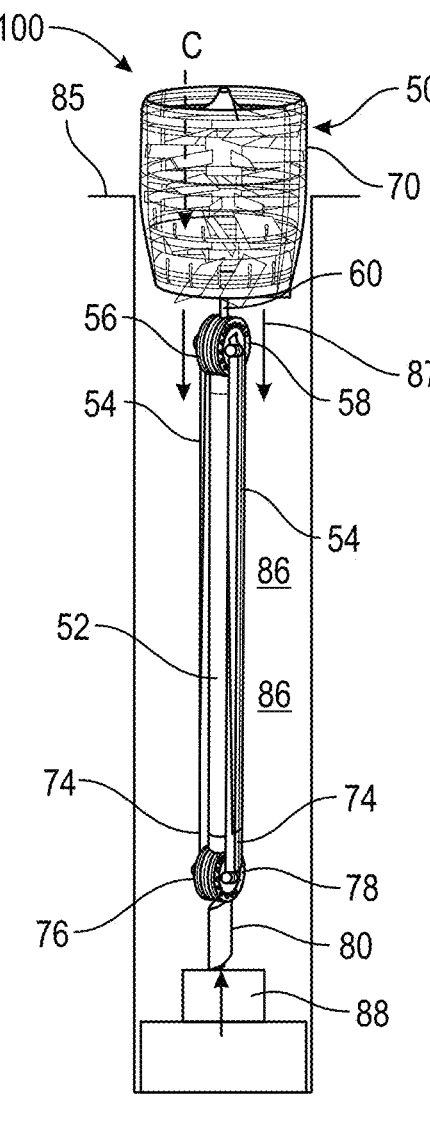

16 that the eVTOL aircraft 50 exits (e.g., takes off from) the chamber 86 without any external aid, as illustrated in FIG. 4B for example. In various embodiments, with momentary reference to FIG. 4C, aircraft container 85 may include a piston 88 which generates upward force to assist launching the eVTOL aircraft 50 upward into the air after which the propulsion system 100 takes over in generating all of the upward thrust for maintaining vertical flight of the eVTOL aircraft 50. In various embodiments, core air flow from propulsion system 100 is used to assist operation of the piston 88. For example, propulsion system 100 may be spun up until sufficient air pressure exists in chamber 86 to activate the piston 88, at which time the piston 88 may be released to launch the eVTOL aircraft 50 from container 85.

Figure 4D:
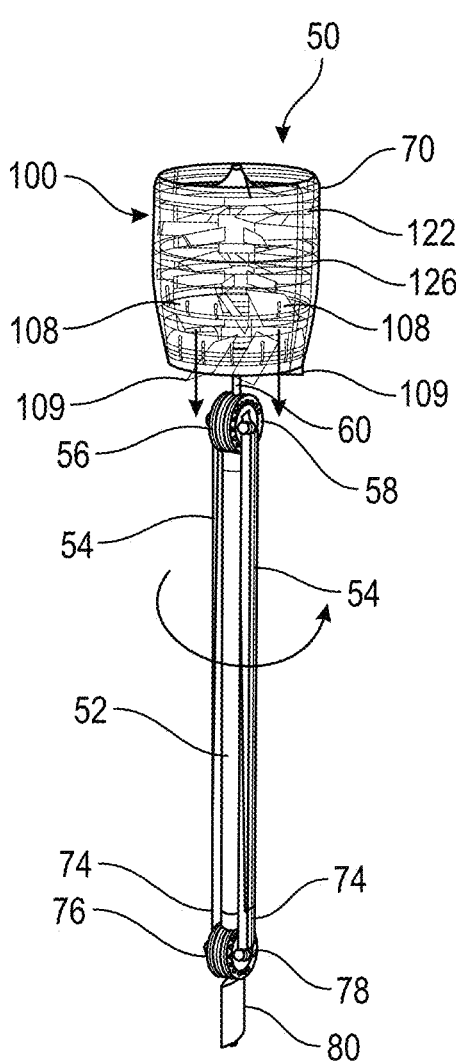
FIG. 4D is a perspective view of the eVTOL hovering in vertical flight with the wings folded against the boom, in accordance with various embodiments.

With reference to FIG. 4D, eVTOL aircraft 50 is illustrated hovering in vertical flight. In this mode, the skyboom 52 can be vertically oriented. Once the eVTOL aircraft 50 is in vertical flight under the thrust of the propulsion system 100, the skyboom 52 may be spun-up using turbine blades 108 and turbine blades 109, for example when vertical flight (rotorcraft mode) is desired. Adjusting the pitch of turbine blades 108 and/or turbine blades 109 can increase rotational torque on stanchion 60 via aerodynamic forces from core air flowing through core air flow path C acting on turbine blades 108 and/or turbine blades 109 to drive rotation of the skyboom 52 abouts its longitudinal axis. The pitch of the turbine blades 108 and/or turbine blades 109, as well as the rotational velocity of rotor blades 122, 126 can be actively adjusted to maintain and/or accelerate angular rotation of the skyboom 52. The rotational velocity of rotor blades 122, 126 can be actively adjusted to maintain, increase, and/or reduce thrust generated by propulsion system 100 to maintain vertical flight of eVTOL aircraft 50.

Figures 4E, 4F:
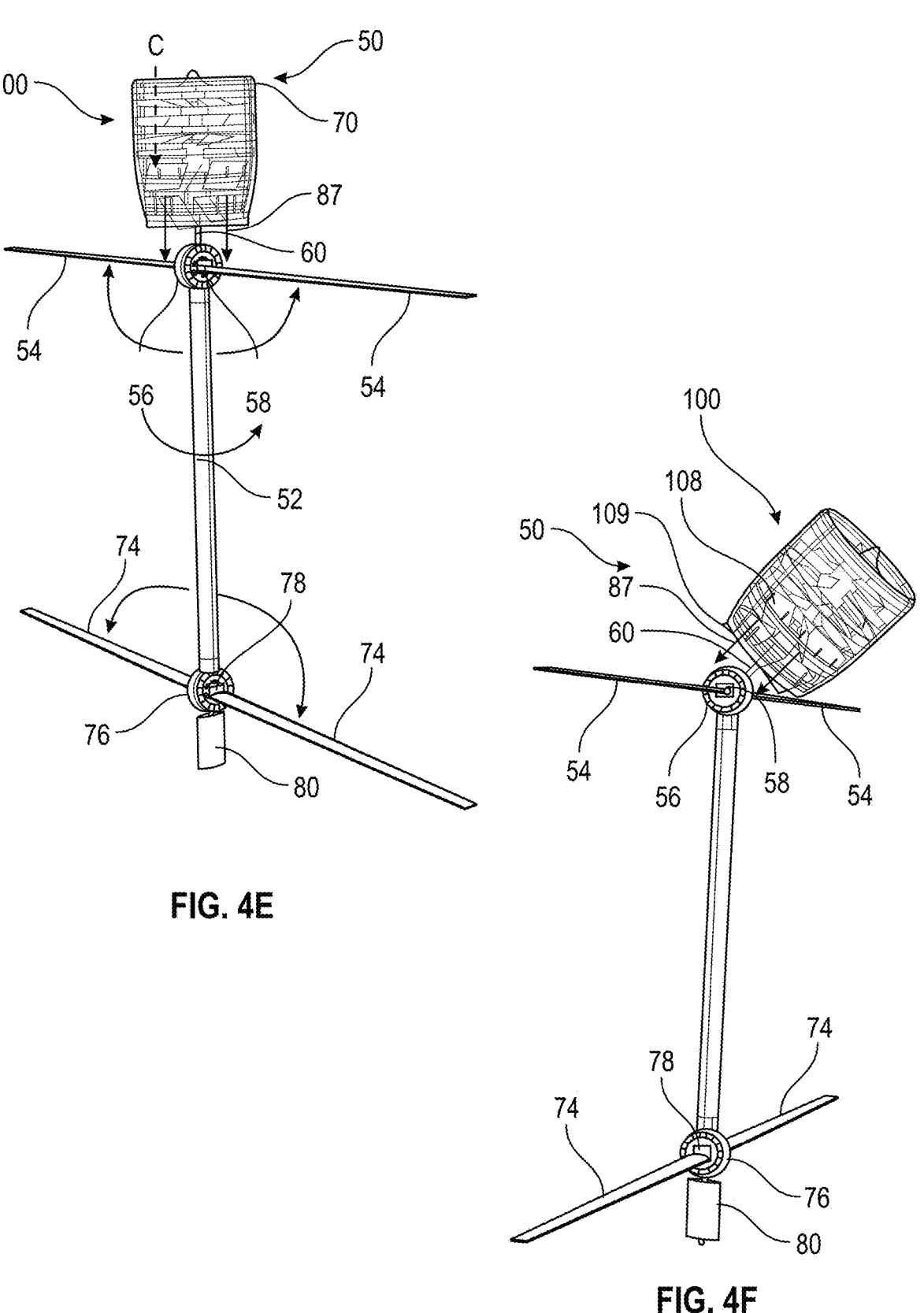
FIG. 4E is a perspective view of the eVTOL hovering in vertical flight with the wings unfolded from the boom and the boom rotating with respect to the propulsion system (e.g., during spin up), in accordance with various embodiments.
FIG. 4F is a perspective view of the eVTOL hovering in vertical flight and transitioning from vertical flight to horizontal winged flight with the propulsion system rotated with respect to the boom, in accordance with various embodiments.

With reference to FIG. 4E, upper wings 54 and lower wings 74 can be extended or unfolded (i.e., moved from the stowed/folded position illustrated in FIG. 4D to the deployed/unfolded position shown in FIG. 4E). With combined reference to FIG. 2C and FIG. 4E, dihedral drive motors 418 at the articulated joint 56 can be activated to drive the rotation of upper wings 54 and deploy/unfold upper wings 54. Similarly, dihedral drive motors 418 at the articulated joint 76 can be activated to drive the rotation of lower wings 74 and deploy/unfold lower wings 74. Centrifugal forces acting on the wings 54, 74 as the skyboom 52 rotates may aid in deployment of the wings 54, 74.

With the upper wings 54 and the lower wings 74 deployed, the turbine blades 108 and turbine blades 109 can maintain angular velocity of the upper wings 54 and the lower wings 74 which generate additional vertical thrust for the eVTOL aircraft 50. In this regard, both the propulsion system 100 and the upper and lower wings 54 and 74 can generate thrust for the eVTOL aircraft 50.

In rotorcraft mode, horizontal thrust can be generated by the upper and/or lower wings 54, 74 by cyclic control of the eVTOL aircraft 50 using drive motors 420 (see FIG. 2C) to independently control the AOA or feathering of the upper and/or lower wings 54, 74. In rotorcraft mode, horizontal thrust can be generated by turbine blades 108 and/or turbine blades 109 (e.g., by rotating turbine blades 108 and/or turbine blades 109 about their longitudinal axis 91 (see FIG. 1G) to divert core air flow in a desired direction (thrust vectoring), such that a component of the diverted air flow is in the horizontal direction.

With reference to FIG. 4F, if horizontal flight is desired (as opposed to rotorcraft mode), rotation of skyboom 52 can be stopped (if the skyboom 52 is rotating), for example using turbine blades 108 and/or turbine blades 109 to decelerate rotation of skyboom 52. Propulsion system 100 can be rotated with respect to skyboom 52, for example using drive motors 408 (see FIG. 3) to cause the stanchion 60 (and the propulsion system 100 mounted thereon) to pivot with respect to skyboom 52. With the propulsion system 100 pivoted with respect to skyboom 52, horizontal thrust is generated by propulsion system 100 and the eVTOL aircraft 50 can begin horizontal flight.

Figure 4G:
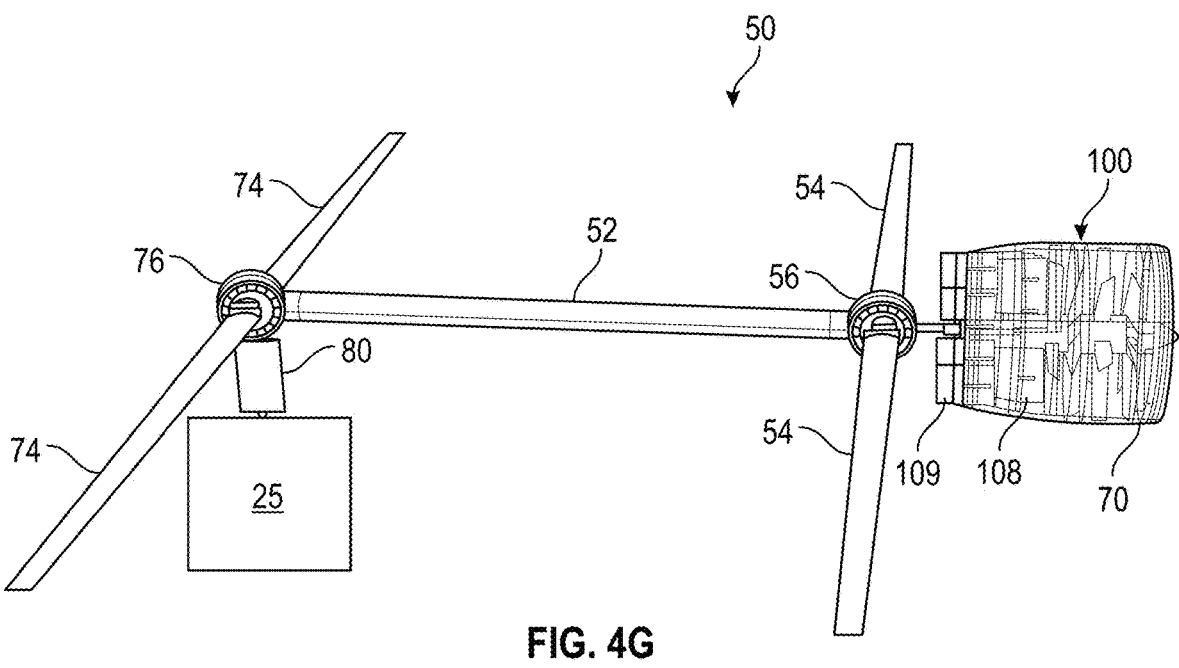
FIG. 4G is a perspective view of the eVTOL during horizontal flight with a payload attached, in accordance with various embodiments.

As the air speed of eVTOL aircraft 50 increases, the skyboom 52 can be progressively pivoted with respect to propulsion system 100 until the skyboom 52 is parallel, or nearly parallel (or any other desired position) with the rotational axis of propulsion system 100 (see FIG. 4G). In this fixed wing mode, the skyboom 52 can be horizontally oriented, wherein the term "horizontally oriented" means that the skyboom is oriented within forty-five degrees of the horizontal direction, and in various embodiments, within fifteen degrees of the horizontal direction. In various embodiments, the skyboom 52 can rotate between forty-five degrees and ninety degrees from the vertically oriented position and the horizontally oriented position. Stated differently, it is contemplated herein that the skyboom 52 may not be oriented exactly horizontal in the fixed wing mode; though in various embodiments it may be oriented parallel to the horizontal direction in the fixed wing mode. As the air speed of e VTOL aircraft 50 increases, the AOA of wings 54, 74 can be varied, e.g., using drive motors 420 (see FIG. 2C and FIG. 3), as desired to generate lift for eVTOL aircraft 50 and to prevent the eVTOL aircraft 50 from stalling. Moreover, the dihedral (or anhedral) of the eVTOL aircraft 50 can be varied as desired using dihedral drive motors 418 (see FIG. 2C and FIG. 3).

In various embodiments, and particularly when the eVTOL aircraft 50 is carrying a payload (e.g., payload 25), the payload connector 80 can be rotated, for example using drive motors 408 (see FIG. 2C) in articulated joint 76 to suspend the payload vertically or nearly vertically (or any other desired position) from skyboom 52. In horizontal flight, the turbine blades 108 and/or turbine blades 109 can provide thrust vectoring by rotating the turbine blades 108, 109 about axis A-A' and/or about their lengths. Transition from horizontal flight to vertical flight can generally be the reverse order of the transition from vertical flight to horizontal flight.

With reference to FIG. 5, a method 700 for picking up cargo with an eVTOL aircraft of the present disclosure is illustrated, in accordance with various embodiments. With combined reference to FIG. 4B and FIG. 5, method 700 includes launching eVTOL aircraft 50 from an aircraft container 85 (e.g., a silo) to generate upward thrust on the eVTOL aircraft 50 and to place the eVTOL aircraft 50 airborne (step 702). eVTOL aircraft 50 can then hover in a VTOL mode using propulsion system 100. With combined reference to FIG. 4F and FIG. 5, method 700 includes unfolding wings 54, 74 and tilting propulsion system 100 with respect to skyboom 52 to begin transitioning from VTOL mode to fixed wing mode (step 704). As the eVTOL aircraft picks up horizontal speed, aerodynamic forces acting on wings 54, 74 may continue to tilt skyboom 52 to a horizontal, or nearly horizontal, position as the eVTOL aircraft 50 flies in fixed wing mode to the site of the payload. It should be understood that where the silo and the payload are in close proximity, fixed wing mode may not be utilized (e.g., the c VTOL aircraft 50 can fly to the payload in rotorcraft mode). As the eVTOL aircraft approaches the target payload, eVTOL aircraft 50 can transition from fixed wing mode back to VTOL mode (step 706). With combined reference to FIG. 2B and FIG. 5, while in VTOL mode, eVTOL aircraft 50 can position itself just above the payload and engage the payload connector with the payload to connect to the payload 25 (e.g., cargo) (see FIG. 2B) (step 708). In various embodiments, wings 54, 74 can be folded or unfolded from skyboom 52 during the payload connection step.

With combined reference to FIG. 4D, FIG. 4E, and FIG. 5, skyboom 52 (and upper wings 54 and lower wings 74) can be spun up to an initial rotational velocity to generate kinetic rotational energy (step 710) which can be converted into lift by pitching the upper wings 54 and/or the lower wings 74 (step 712). This initial spin up can be achieved using turbine blades 108 and/or turbine blades 109, and/or electric motors 466 (see FIG. 2E). For example, to initiate rotation of skyboom 52, upper wings 54 and lower wings 74 can be folded against skyboom 52 (see FIG. 4D) and turbine blades 108 and/or turbine blades 109 and/or electric motors 466 (see FIG. 2E) can be used to begin rotating skyboom 52 with respect to payload 25 and duct 70. As the skyboom 52 accelerates and generates rotational energy (momentum), the wings 54, 74 can be unfolded. Initially, the wings 54, 74 can be set to a neutral pitch angle to minimize aerodynamic forces opposing rotation of the wings 54, 74. Once the initial rotational velocity is achieved, a pitch angle of the upper wings 54 and/or the lower wings 74 can then be increased and said generated kinetic rotational energy can be converted into a lift force (step 712). The rotational velocity of the skyboom 52 can decrease to a rotational velocity which can then be maintained using chemical energy (i.e., electrical energy stored in a battery pack) and/or aerodynamic forces acting on turbine blades 108. This initial "over" spinning of the skyboom 52 can be particularly useful when lifting payload from a static position (i.e., to accelerate the payload) where increased lift may be helpful. It should be understood that batteries are stored in skyboom 52. Thus, both kinetic energy and chemical/electric energy can be generated using the batteries. The azimuth angle of the payload (e.g., the azimuth of the payload connector 80) can be monitored to maintain a heading and/or rotational stability of the payload (step 714). Motors 466 (see FIG. 2E) can be used to maintain the heading of the payload. Stated differently, motors 466 (see FIG. 2E) can be used to control an orientation and/or direction (e.g., azimuth) of the payload.

In various embodiments, an electrical connector can be included with payload connector 80 whereby electrical energy is transferred between eVTOL aircraft 50 and the payload 25. In various embodiments, payload 25 includes a power source for charging the batteries onboard eVTOL aircraft 50, thereby increasing the range of eVTOL aircraft 50 as desired. In various embodiments, a power source (e.g., batteries) onboard eVTOL aircraft 50 are utilized to charge a power source of payload 25, thereby increasing the range of payload 25 (e.g., payload 25 may comprise an electric vehicle or other electric equipment) as desired.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

Additional principles of the present disclosure are contained in the attached Appendix, the contents of which are incorporated herein by reference in their entirety.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An aircraft comprising:
a boom;
a propulsion system coupled to a first end of the boom via a stanchion;
a first wing coupled to a second end of the boom;
wherein the propulsion system comprises a first plurality of rotor blades configured to rotate about a propulsion system longitudinal axis, a first plurality of stator vanes, and a plurality of turbine blades disposed at an exit of the propulsion system,
the plurality of turbine blades are coupled to, and configured to rotate with, the stanchion, and
each turbine blade is configured to rotate about an axis through a length thereof for diverting a core air flow through the propulsion system to thereby impart a torque onto the stanchion to rotate the boom with respect to the first plurality of stator vanes.

2. The aircraft of claim 1, wherein the propulsion system further comprises a second plurality of rotor blades and a second plurality of stator vanes,
wherein the first plurality of stator vanes is located axially between the first plurality of rotor blades and the second plurality of rotor blades, and
the second plurality of stator vanes is located axially between the second plurality of rotor blades and the plurality of turbine blades.

3. The aircraft of claim 1, wherein the plurality of turbine blades is configured to rotate about the propulsion system longitudinal axis.

4. The aircraft of claim 2, wherein the propulsion system further comprises a duct coupled to the first plurality of stator vanes and defining a core flow path.

5. The aircraft of claim 1, further comprising a first articulated joint including a first electric motor configured to rotate the first wing about a longitudinal axis thereof with respect to the boom and a second electric motor configured to rotate the first wing about a lateral axis thereof with respect to the boom.

6. The aircraft of claim 5, wherein the first articulated joint further comprises:
a first driven gear meshingly engaged with the first electric motor;
opposing flanges extending from the first driven gear; and
a shaft pivotally coupled to the opposing flanges, whereby the first wing is pivotally mounted to the first articulated joint.

7. The aircraft of claim 5, further comprising a payload connector rotatably coupled to the first articulated joint;
the first articulated joint further comprises a frame and a third electric motor mounted to the frame; and
the third electric motor is configured to rotate the boom with respect to the payload connector.

8. An aircraft comprising:
a boom;
a propulsion system coupled to a first end of the boom via a stanchion; and
a first wing coupled to a second end of the boom via a first articulated joint, wherein the first articulated joint comprises:
a first electric motor configured to rotate the first wing about a longitudinal axis thereof with respect to the boom;
a second electric motor configured to rotate the first wing about a lateral axis thereof with respect to the boom;
a frame:
a shell surrounding the frame whereby the boom is connected to the first articulated joint; and
a third electric motor configured to rotate the frame with respect to the shell.

9. The aircraft of claim 8, wherein the first articulated joint further comprises:
a first driven gear meshingly engaged with the first electric motor;
opposing flanges extending from the first driven gear; and
a shaft pivotally coupled to the opposing flanges, whereby the first wing is pivotally mounted to the first articulated joint.

10. The aircraft of claim 9, wherein the first articulated joint further comprises a drive lobe extending from the shaft, wherein the drive lobe meshingly engages the second electric motor.

11. The aircraft of claim 8, wherein the first articulated joint further comprises a second driven gear coupled to the frame for providing a drive mechanism to rotate the frame with respect to the boom; and
the third electric motor meshingly engages the second driven gear.

12. The aircraft of claim 11, wherein the first articulated joint further comprises:
a brake rotor extending from a radially inward facing surface of shell; and
a disc brake mounted to the frame, the disc brake configured to clamp to the brake rotor to prevent rotation of the shell with respect to the frame.

13. The aircraft of claim 12, further comprising:

a payload connector rotatably coupled to the first articulated joint; and a fourth electric motor mounted to the frame and configured to rotate the boom with respect to the payload connector.

14. The aircraft of claim 8, wherein the boom is configured to rotate together with the first wing in a rotorcraft mode to generate thrust for the aircraft.

15. The aircraft of claim 8, further comprising a second wing coupled to the first end of the boom via a second articulated joint.

16. The aircraft of claim 15, wherein the second articulated joint comprises:

an inner sleeve mounted to the stanchion;

an outer sleeve; and a bearing disposed between the inner sleeve and the outer sleeve whereby the outer sleeve is rotatable with respect to the inner sleeve.

17. A method, comprising:

generating a thrust with an electric propulsion system coupled, via a stanchion, to a first end of a fuselage for an eVTOL aircraft, the thrust oriented in a vertical direction, the propulsion system comprises a first plurality of rotor blades configured to rotate about a propulsion system longitudinal axis, a first plurality of stator vanes, and a plurality of turbine blades disposed at an exit of the propulsion system, the plurality of turbine blades are coupled to, and configured to rotate with, the stanchion, and each turbine blade is configured to rotate about an axis through a length thereof for diverting a core air flow through the propulsion system to thereby impart a torque onto the stanchion to rotate the boom with respect to the first plurality of stator vanes;

launching the eVTOL aircraft from an aircraft container;

hovering the eVTOL aircraft in vertical flight with the fuselage of the eVTOL aircraft vertically oriented;

rotating a first wing of the eVTOL aircraft from a first folded position to a first unfolded position;

rotating a second wing of the eVTOL aircraft from a second folded position to a second unfolded position;

rotating the electric propulsion system with respect to the fuselage to orient the thrust to have a component in a horizontal direction;

generating lift with at least one of the first wing and the second wing; and rotating the fuselage to a horizontally oriented position in response to generating the lift.

18. The method of claim 17, further comprising:

connecting the eVTOL aircraft to a cargo;

operating an electric motor in an articulated joint of the eVTOL aircraft to spin up the fuselage; and generating vertical lift with the first wing and the second wing in response to the fuselage spinning.

19. The method of claim 18, further comprising operating a payload connector motor to adjust an azimuth angle of the cargo.

20. The aircraft of claim 9, wherein the first driven gear is configured to rotate about the longitudinal axis of the first wing.

* * * * *